(12) United States Patent
Wang et al.

(10) Patent No.: US 11,087,411 B2
(45) Date of Patent: Aug. 10, 2021

(54) COMPUTERIZED TAX RETURN PREPARATION SYSTEM AND COMPUTER GENERATED USER INTERFACES FOR TAX TOPIC COMPLETION STATUS MODIFICATIONS

(71) Applicant: INTUIT INC., Mountain View, CA (US)

(72) Inventors: Gang Wang, San Diego, CA (US); Sasha Mikhael Perez, Del Mar, CA (US); Kevin M. McCluskey, Carlsbad, CA (US); Alex G. Balazs, San Diego, CA (US); Ronald Jason Char, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 1381 days.

(21) Appl. No.: 15/221,424

(22) Filed: Jul. 27, 2016

(65) Prior Publication Data
US 2018/0033092 A1 Feb. 1, 2018

(51) Int. Cl.
*G06Q 40/00* (2012.01)
(52) U.S. Cl.
CPC ............... *G06Q 40/123* (2013.12)
(58) Field of Classification Search
CPC ..... G06Q 40/123; G06F 17/243; G06F 9/453; G06K 9/00449; G06K 9/00288
See application file for complete search history.

(56) References Cited

U.S. PATENT DOCUMENTS

| 4,213,251 A | 7/1980 | Foundos |
| 4,809,219 A | 2/1989 | Ashford et al. |

(Continued)

FOREIGN PATENT DOCUMENTS

| JP | 2002-117121 A | 4/2002 |
| JP | 2005-190425 A | 7/2005 |

(Continued)

OTHER PUBLICATIONS

Tax Software Buyers Guide, Jounal of Accountancy 1994.*
(Continued)

*Primary Examiner* — Richard C Weisberger
(74) *Attorney, Agent, or Firm* — DLA Piper LLP (US)

(57) ABSTRACT

A modular, computerized tax return preparation application engine including modular tax logic engine and interface controller components loosely coupled to each other and a modular completion monitor. Modular tax logic engine receives runtime data of the tax return and generates a first non-binding suggestion involving a tax topic that is incomplete based on first runtime data and a decision table. Modular interface controller generates a first interface including a first interview screen including content based on the first non-binding suggestion. For iterations or changes of runtime data, completion monitor determines when a previously complete tax topic is now incomplete and notifies modular interface controller regarding the completion status modification. In response modular interface controller generates a second interface comprising an encoded link to an interview screen or screens to address previously complete but currently incomplete tax topics.

37 Claims, 21 Drawing Sheets

(56) References Cited

U.S. PATENT DOCUMENTS

| | | |
|---|---|---|
| 5,006,998 A | 4/1991 | Yasunobu |
| 5,495,607 A | 2/1996 | Pisello et al. |
| 5,557,761 A | 9/1996 | Chan et al. |
| 5,673,369 A | 9/1997 | Kim |
| 5,742,836 A | 4/1998 | Turpin et al. |
| 5,819,249 A | 10/1998 | Dohanich |
| 6,078,898 A | 6/2000 | Davis |
| 6,535,883 B1 | 3/2003 | Lee et al. |
| 6,601,055 B1 | 7/2003 | Roberts |
| 6,631,361 B1 | 10/2003 | O'Flaherty et al. |
| 6,670,969 B1 | 12/2003 | Halstead et al. |
| 6,690,854 B2 | 2/2004 | Helbing |
| 6,697,787 B1 | 2/2004 | Miller |
| 6,898,573 B1 | 5/2005 | Piehl |
| 6,912,508 B1 | 6/2005 | McCalden |
| 7,234,103 B1 | 6/2007 | Regan |
| 7,295,998 B2 | 11/2007 | Kulkarni |
| 7,331,045 B2 | 2/2008 | Martin et al. |
| 7,448,022 B1 | 11/2008 | Ram et al. |
| 7,539,635 B1 | 5/2009 | Peak et al. |
| 7,565,312 B1 | 7/2009 | Shaw |
| 7,603,301 B1 | 10/2009 | Regan |
| 7,668,763 B1 | 2/2010 | Albrecht |
| 7,680,756 B2 | 3/2010 | Quinn |
| 7,685,082 B1 | 3/2010 | Coletta |
| 7,693,760 B1 | 4/2010 | Fiteni |
| 7,693,769 B1 | 4/2010 | Burlison et al. |
| 7,716,094 B1 | 5/2010 | Sutter et al. |
| 7,742,958 B1 | 6/2010 | Leek |
| 7,747,484 B2 | 6/2010 | Stanley |
| 7,761,333 B2 | 7/2010 | Kapp |
| 7,778,895 B1 | 8/2010 | Baxter |
| 7,818,222 B2 | 10/2010 | Allanson et al. |
| 7,849,405 B1 | 12/2010 | Coletta |
| 7,860,763 B1 | 12/2010 | Quinn et al. |
| 7,865,829 B1 | 1/2011 | Goldfield |
| 7,895,102 B1 | 2/2011 | Wilks et al. |
| 7,899,757 B1 | 3/2011 | Talan |
| 7,900,298 B1 | 3/2011 | Char et al. |
| 7,908,190 B2 | 3/2011 | Enenkiel |
| 7,912,767 B1 | 3/2011 | Cheatham et al. |
| 7,912,768 B2 | 3/2011 | Abeles |
| 7,925,553 B2 | 4/2011 | Banks |
| 7,991,664 B1 * | 8/2011 | Stone .................. G06Q 40/123 705/35 |
| 8,001,006 B1 | 8/2011 | Yu et al. |
| 8,019,664 B1 | 9/2011 | Tifford et al. |
| 8,082,144 B1 | 12/2011 | Brown et al. |
| 8,086,970 B2 | 12/2011 | Achtermann et al. |
| 8,108,258 B1 | 1/2012 | Slattery |
| 8,126,820 B1 | 2/2012 | Talan |
| 8,190,499 B1 | 5/2012 | McVickar |
| 8,204,805 B2 | 6/2012 | Eftekhari |
| 8,224,726 B2 | 7/2012 | Murray |
| 8,234,562 B1 | 7/2012 | Evans |
| 8,244,607 B1 | 8/2012 | Quinn |
| 8,346,635 B1 | 1/2013 | Olim |
| 8,346,680 B2 | 1/2013 | Castleman |
| 8,370,795 B1 | 2/2013 | Sage |
| 8,386,344 B2 | 2/2013 | Christina |
| 8,407,113 B1 | 3/2013 | Eftekhari et al. |
| 8,417,596 B1 | 4/2013 | Dunbar et al. |
| 8,417,597 B1 | 4/2013 | McVickar |
| 8,447,667 B1 | 5/2013 | Dinamani et al. |
| 8,452,676 B1 | 5/2013 | Talan |
| 8,473,880 B1 | 6/2013 | Bennett et al. |
| 8,478,671 B1 | 7/2013 | Tifford |
| 8,510,187 B1 | 8/2013 | Dinamani |
| 8,527,375 B1 | 9/2013 | Olim |
| 8,560,409 B2 | 10/2013 | Abeles |
| 8,583,516 B1 | 11/2013 | Pitt et al. |
| 8,589,262 B1 | 11/2013 | Gang |
| 8,607,353 B2 | 12/2013 | Rippert et al. |
| 8,635,127 B1 | 1/2014 | Shaw |
| 8,639,616 B1 | 1/2014 | Rolenaitis |
| 8,682,756 B1 | 3/2014 | Tifford et al. |
| 8,682,829 B2 | 3/2014 | Barthel |
| 8,694,395 B2 | 4/2014 | Houseworth |
| 8,706,580 B2 | 4/2014 | Houseworth |
| 8,788,412 B1 | 7/2014 | Hamm |
| 8,812,380 B2 | 8/2014 | Murray |
| 8,813,178 B1 | 8/2014 | Khanna |
| 8,838,492 B1 | 9/2014 | Baker |
| 8,892,467 B1 | 11/2014 | Ball |
| 8,949,270 B2 | 2/2015 | Newton et al. |
| 9,372,687 B1 | 6/2016 | Pai |
| 9,690,854 B2 | 6/2017 | Stent et al. |
| 9,760,953 B1 | 9/2017 | Wang et al. |
| 9,916,628 B1 * | 3/2018 | Wang .................. G06Q 40/123 |
| 9,922,376 B1 | 3/2018 | Wang et al. |
| 9,990,678 B1 | 6/2018 | Cabrera et al. |
| 10,970,793 B1 * | 4/2021 | Wang .................. G06Q 40/123 |
| 2002/0065831 A1 | 5/2002 | DePaolo |
| 2002/0107698 A1 | 8/2002 | Brown et al. |
| 2002/0111888 A1 | 8/2002 | Stanley et al. |
| 2002/0174017 A1 | 11/2002 | Singh |
| 2002/0198832 A1 | 12/2002 | Agee |
| 2003/0101070 A1 | 5/2003 | Mahosky et al. |
| 2003/0126054 A1 | 7/2003 | Purcell |
| 2003/0139827 A1 | 7/2003 | Phelps |
| 2003/0174157 A1 | 9/2003 | Hellman |
| 2003/0182102 A1 | 9/2003 | Corston-Oliver et al. |
| 2004/0002906 A1 | 1/2004 | Von Drehnen et al. |
| 2004/0019540 A1 | 1/2004 | William |
| 2004/0019541 A1 | 1/2004 | William |
| 2004/0021678 A1 | 2/2004 | Ullah |
| 2004/0078271 A1 | 4/2004 | Morano |
| 2004/0083164 A1 | 4/2004 | Schwartz et al. |
| 2004/0088233 A1 | 5/2004 | Brady |
| 2004/0117395 A1 | 6/2004 | Gong |
| 2004/0172347 A1 | 9/2004 | Barthel |
| 2004/0181543 A1 | 9/2004 | Wu et al. |
| 2004/0205008 A1 | 10/2004 | Haynie et al. |
| 2005/0171822 A1 | 8/2005 | Cagan |
| 2005/0216379 A1 | 9/2005 | Ozaki |
| 2005/0262191 A1 | 11/2005 | Mamou et al. |
| 2006/0112114 A1 | 5/2006 | Yu |
| 2006/0155618 A1 | 7/2006 | Wyle |
| 2006/0155632 A1 | 7/2006 | Cherkas et al. |
| 2006/0178961 A1 | 8/2006 | Stanley et al. |
| 2006/0282354 A1 | 12/2006 | Varghese |
| 2006/0293990 A1 | 12/2006 | Schaub |
| 2007/0033116 A1 | 2/2007 | Murray |
| 2007/0033117 A1 | 2/2007 | Murray |
| 2007/0033130 A1 | 2/2007 | Murray |
| 2007/0055571 A1 | 3/2007 | Fox et al. |
| 2007/0094207 A1 | 4/2007 | Yu et al. |
| 2007/0136157 A1 | 6/2007 | Neher et al. |
| 2007/0150387 A1 | 6/2007 | Seubert et al. |
| 2007/0156564 A1 | 7/2007 | Humphrey et al. |
| 2007/0179841 A1 | 8/2007 | Agassi |
| 2007/0192166 A1 | 8/2007 | Van Luchene |
| 2007/0250418 A1 | 10/2007 | Banks et al. |
| 2008/0059900 A1 | 3/2008 | Murray |
| 2008/0097878 A1 | 4/2008 | Abeles |
| 2008/0126170 A1 | 5/2008 | Leck et al. |
| 2008/0147494 A1 | 6/2008 | Larson |
| 2008/0162310 A1 | 7/2008 | Quinn |
| 2008/0177631 A1 | 7/2008 | William |
| 2008/0215392 A1 | 9/2008 | Rajan |
| 2008/0243531 A1 | 10/2008 | Hyder et al. |
| 2009/0024694 A1 | 1/2009 | Fong |
| 2009/0037305 A1 | 2/2009 | Sander |
| 2009/0037847 A1 | 2/2009 | Achtermann et al. |
| 2009/0048957 A1 | 2/2009 | Celano |
| 2009/0064851 A1 | 3/2009 | Morris et al. |
| 2009/0117529 A1 | 5/2009 | Goldstein |
| 2009/0125618 A1 | 5/2009 | Huff |
| 2009/0138389 A1 | 5/2009 | Barthel |
| 2009/0150169 A1 | 6/2009 | Kirkwood |
| 2009/0157572 A1 | 6/2009 | Chidlovskii |
| 2009/0193389 A1 | 7/2009 | Miller |
| 2009/0204881 A1 | 8/2009 | Murthy |
| 2009/0239650 A1 | 9/2009 | Alderucci et al. |

(56) References Cited

U.S. PATENT DOCUMENTS

| | | |
|---|---|---|
| 2009/0248594 A1 | 10/2009 | Castleman |
| 2009/0248603 A1 | 10/2009 | Kiersky |
| 2010/0036760 A1 | 2/2010 | Abeles |
| 2010/0088124 A1 | 4/2010 | Diefendorf et al. |
| 2010/0131394 A1 | 5/2010 | Rutsch et al. |
| 2010/0153138 A1 | 6/2010 | Evans |
| 2011/0004537 A1 | 1/2011 | Allanson et al. |
| 2011/0078062 A1 | 3/2011 | Kleyman |
| 2011/0145112 A1 | 6/2011 | Abeles |
| 2011/0173222 A1 | 7/2011 | Sayal et al. |
| 2011/0225220 A1 | 9/2011 | Huang et al. |
| 2011/0258195 A1 | 10/2011 | Welling |
| 2011/0258610 A1 | 10/2011 | Aaraj et al. |
| 2011/0264569 A1 | 10/2011 | Houseworth |
| 2012/0016817 A1 | 1/2012 | Smith et al. |
| 2012/0027246 A1 | 2/2012 | Tifford |
| 2012/0030076 A1 | 2/2012 | Checco et al. |
| 2012/0030577 A1 | 2/2012 | Akolkar et al. |
| 2012/0072321 A1 | 3/2012 | Christian et al. |
| 2012/0109792 A1 | 5/2012 | Eftekhari et al. |
| 2012/0109793 A1 | 5/2012 | Abeles |
| 2012/0136764 A1 | 5/2012 | Miller |
| 2012/0278365 A1 | 11/2012 | Labat et al. |
| 2013/0036347 A1 | 2/2013 | Eftekhari |
| 2013/0080302 A1 | 3/2013 | Allanson et al. |
| 2013/0097262 A1 | 4/2013 | Dandison |
| 2013/0111032 A1 | 5/2013 | Alapati et al. |
| 2013/0138586 A1 | 5/2013 | Jung et al. |
| 2013/0185347 A1 | 7/2013 | Romano |
| 2013/0187926 A1 | 7/2013 | Silverstein et al. |
| 2013/0198047 A1 | 8/2013 | Houseworth |
| 2013/0218735 A1 | 8/2013 | Murray |
| 2013/0262279 A1 | 10/2013 | Finley et al. |
| 2013/0282539 A1 | 10/2013 | Murray |
| 2013/0290169 A1 | 10/2013 | Bathula |
| 2014/0108213 A1 | 4/2014 | Houseworth |
| 2014/0172656 A1 | 6/2014 | Shaw |
| 2014/0201045 A1 | 7/2014 | Pai et al. |
| 2014/0207633 A1 | 7/2014 | Aldrich et al. |
| 2014/0241631 A1 | 8/2014 | Huang |
| 2014/0244455 A1 | 8/2014 | Huang |
| 2014/0244457 A1 | 8/2014 | Howell et al. |
| 2014/0337189 A1 | 11/2014 | Barsade et al. |
| 2015/0142703 A1 | 5/2015 | Rajesh |
| 2015/0237205 A1 | 8/2015 | Waller et al. |
| 2015/0254623 A1 | 9/2015 | Velez et al. |
| 2015/0269491 A1 | 9/2015 | Tripathi et al. |
| 2016/0027127 A1 | 1/2016 | Chavarria et al. |
| 2016/0063645 A1 | 3/2016 | Houseworth et al. |
| 2016/0071112 A1 | 3/2016 | Unser |
| 2016/0078567 A1 | 3/2016 | Goldman et al. |
| 2016/0092993 A1 | 3/2016 | Ciaramitaro |
| 2016/0092994 A1 | 3/2016 | Roebuck et al. |
| 2016/0098804 A1 | 4/2016 | Mascaro et al. |
| 2016/0148321 A1 | 5/2016 | Ciaramitaro et al. |
| 2016/0275627 A1 | 9/2016 | Wang |
| 2017/0004583 A1 | 1/2017 | Wang |
| 2017/0004584 A1 | 1/2017 | Wang |
| 2017/0032468 A1 | 2/2017 | Wang et al. |
| 2018/0032855 A1 | 2/2018 | Wang et al. |

FOREIGN PATENT DOCUMENTS

| | | |
|---|---|---|
| JP | 2014-206960 A | 10/2014 |
| KR | 10-2012-0011987 A | 2/2012 |
| WO | 2017/004094 A1 | 1/2017 |
| WO | 2017004095 A1 | 1/2017 |
| WO | 2017019233 A1 | 2/2017 |
| WO | 2017116496 A1 | 7/2017 |
| WO | 2017116497 A1 | 7/2017 |
| WO | 2018022023 A1 | 2/2018 |
| WO | 2018022128 A1 | 2/2018 |
| WO | 2018/080562 A1 | 5/2018 |
| WO | 2018/080563 A1 | 5/2018 |

OTHER PUBLICATIONS

Office Action dated Dec. 28, 2017 in U.S. Appl. No. 14/097,057, filed Dec. 4, 2013, (10pages).
Office Action dated Jan. 12, 2018 in U.S. Appl. No. 14/462,345, filed Aug. 18, 2014, (9pages).
Office Action dated Jan. 30, 2018 in U.S. Appl. No. 14/553,347, filed Nov. 25, 2014, (40pages).
Office Action dated Dec. 12, 2017 in U.S. Appl. No. 14/698,733, filed Apr. 28, 2015, (90pages).
Response dated Feb. 12, 2018 in U.S. Appl. No. 14/698,733, filed Apr. 28, 2015, (36pages).
Advisory Action dated Feb. 16, 2018 in U.S. Appl. No. 14/698,733, filed Apr. 28, 2015, (3pages).
Response dated Jan. 3, 2018 in U.S. Appl. No. 14/448,678, filed Jul. 31, 2014, (37pages).
Advisory Action dated Feb. 5, 2018 in U.S. Appl. No. 14/448,678, filed Jul. 31, 2014, (7pages).
Office Action dated Feb. 12, 2018 in U.S. Appl. No. 14/555,553, filed Nov. 26, 2014, (40pages).
Notice of Allowability dated Dec. 22, 2017 in U.S. Appl. No. 14/529,736, filed Oct. 31, 2014, (13pages).
Office Action dated Dec. 28, 2017 in U.S. Appl. No. 14/529,798, filed Oct. 31, 2014, (61pages).
Response dated Jan. 16, 2018 in U.S. Appl. No. 14/530,159, filed Oct. 31, 2014, (13pages).
Interview Summary dated Feb. 5, 2018 in U.S. Appl. No. 14/530,159, filed Oct. 31, 2014, (3pages).
Office Action dated Jan. 12, 2018 in U.S. Appl. No. 14/755,684, filed Jun. 30, 2015, (31pages).
PCT International Preliminary Report on Patentability (Chapter I of the Patent Cooperation Treaty) for PCT/US2016/039919, Applicant: Intuit Inc., Form PCT/IB/326 and 373, dated Jan. 11, 2018, (11pages).
Response dated Feb. 15, 2018 in U.S. Appl. No. 14/206,834, filed Mar. 12, 2014, (36pages).
Interview Summary dated Feb. 15, 2018 in U.S. Appl. No. 14/206,834, filed Mar. 12, 2014, (3pages).
Response dated Jan. 5, 2018 in U.S. Appl. No. 14/555,902, filed Nov. 28, 2014, (14pages).
Response dated Dec. 8, 2017 in U.S. Appl. No. 14/555,939, filed Nov. 28, 2014, (52pages).
Office Action dated Jan. 18, 2018 in U.S. Appl. No. 14/207,121, filed Mar. 12, 2014, (22pages).
Response dated Jan. 31, 2018 in U.S. Appl. No. 14/557,335, filed Dec. 1, 2014, (26pages).
Office Action dated Feb. 9, 2018 in U.S. Appl. No. 14/462,315, filed Aug. 18, 2014, (38pages).
Notice of Allowance and Fee(s) Due dated Jan. 25, 2018 in U.S. Appl. No. 14/448,481, filed Jul. 31, 2014, (62pages).
Interview Summary dated Feb. 9, 2018 in U.S. Appl. No. 14/448,481, filed Jul. 31, 2014, (8pages).
Response dated Dec. 22, 2017 in U.S. Appl. No. 14/698,746, filed Apr. 28, 2015, (15pages).
Office Action dated Jan. 26, 2018 in U.S. Appl. No. 14/461,982, filed Aug. 18, 2014, (94pages).
Interview Summary dated Dec. 15, 2017 in U.S. Appl. No. 14/755,859, filed Jun. 30, 2015, (4pages).
PCT International Preliminary Report on Patentability (Chapter I of the Patent Cooperation Treaty) for PCT/US2016/039918, Applicant: Intuit Inc., Form PCT/IB/326 and 373, dated Jan. 11, 2018, (11pages).
Response dated Jan. 10, 2018 in U.S. Appl. No. 14/448,962, filed Jul. 31, 2014, (27pages).
Interview Summary dated Feb. 20, 2018 in U.S. Appl. No. 14/448,962, filed Jul. 31, 2014, (3pages).
Response dated Feb. 16, 2018 in U.S. Appl. No. 14/448,986, filed Jul. 31, 2014, (16pages).
Office Action dated Feb. 8, 2018 in U.S. Appl. No. 14/462,411, filed Aug. 18, 2014, (76pages).
Office Action dated Feb. 5, 2018 in U.S. Appl. No. 14/555,334, filed Nov. 26, 2014, (52pages).

(56) References Cited

OTHER PUBLICATIONS

Response dated Jan. 11, 2018 in U.S. Appl. No. 14/701,030, filed Apr. 30, 2015, (35pages).
Response dated Dec. 22, 2017 in U.S. Appl. No. 14/673,646, filed Mar. 30, 2015, (22pages).
Interview Summary dated Dec. 28, 2017 in U.S. Appl. No. 14/673,646, filed Mar. 30, 2015, (3pages).
Response dated Feb. 13, 2018 in U.S. Appl. No. 14/462,397, filed Aug. 18, 2014, (33pages).
Cronin, Julie-Anne et al., Distributing the Corporate Income Tax: Revised U.S. Treasury Methodology, May 2012, Department of Treasury, web, 2-31 (Year:2012) (34pages).
Notice of Allowance and Fee(s) Due dated Feb. 20, 2018 in U.S. Appl. No. 14/675,166, filed Mar. 31, 2015, (52pages).
Interview Summary dated Dec. 21, 2017 in U.S. Appl. No. 14/555,222, filed Nov. 26, 2014, (2pages).
Office Action dated Feb. 5, 2018 in U.S. Appl. No. 14/555,222, filed Nov. 26, 2014, (4pages).
Response dated Dec. 18, 2017 in U.S. Appl. No. 14/555,543, filed Nov. 26, 2014, (20pages).
Advisory Action dated Jan. 17, 2018 in U.S. Appl. No. 14/555,543, filed Nov. 26, 2014, (3pages).
Response dated Jan. 18, 2018 in U.S. Appl. No. 14/555,543, filed Nov. 26, 2014, (20pages).
Office Action dated Feb. 14, 2018 in U.S. Appl. No. 14/555,543, filed Nov. 26, 2014, (18pages).
Response dated Jan. 25, 2018 in U.S. Appl. No. 14/700,981, filed Apr. 30, 2015, (30pages).
Response dated Dec. 26, 2017 in U.S. Appl. No. 14/673,555, filed Mar. 30, 2015, (22pages).
Interview Summary dated Jan. 19, 2018 in U.S. Appl. No. 14/673,555, filed Mar. 30, 2015, (3pages).
Response dated Dec. 28, 2017 in U.S. Appl. No. 14/701,149, filed Apr. 30, 2015, (46pages).
PCT International Preliminary Report on Patentability (Chapter I of the Patent Cooperation Treaty) for PCT/US2016/039917, Applicant: Intuit, Inc., Form PCT/IB/326 and 373, dated Feb. 8, 2018 (13pages).
Notice of Allowance and Fee(s) Due dated May 5, 2017 in U.S. Appl. No. 14/206,682, (30pages).
PCT International Search Report for PCT/US2016/044094, Applicant: Intuit Inc., Form PCT/ISA/210 and 220, dated Apr. 24, 2017 (5pages).
PCT Written Opinion of the International Search Authority for PCT/US2016/044094, Applicant: Intuit Inc., Form PCT/ISA/237, dated Apr. 24, 2017 (5pages).
PCT International Search Report for PCT/US2016/067839, Applicant: Intuit Inc., Form PCT/ISA/210 and 220, dated Apr. 25, 2017 (5pages).
PCT Written Opinion of the International Search Authority for PCT/US2016/067839, Applicant: Intuit Inc., Form PCT/ISA/237, dated Apr. 26, 2017 (12pages).
Amendment dated May 3, 2017 in U.S. Appl. No. 14/462,411, filing date: Aug. 18, 2014, (5pages).
Response dated May 15, 2017 in U.S. Appl. No. 14/448,962, filing date: Jul. 31, 2014, (30pages).
Office Action dated May 15, 2017 in U.S. Appl. No. 14/462,345, filing date: Aug. 18, 2014, (57pages).
Office Action dated May 15, 2017 in U.S. Appl. No. 14/555,902, filing date: Nov. 28, 2014, (8pages).
Office Action dated May 2, 2017 in U.S. Appl. No. 14/698,733, filing date: Apr. 28, 2015, (31pages).
PCT International Search Report for PCT/US2017/062777, Applicant: Intuit Inc., Form PCT/ISA/210 and 220, dated: Feb. 21, 2018 (5pages).
PCT Written Opinion of the International Search Authority for PCT/US2017/062777, Applicant: The Regents of the University of California, Form PCT/ISA/237, dated: Feb. 21, 2018 (8pages).
Office Action dated Feb. 22, 2018 in U.S. Appl. No. 14/673,261, filed Mar. 30, 2015, (46pages).
Wikipedia, https://en.wikipedia.org/wiki/Data_structure, "Data Structures", Jan. 12, 2012, entire page (Year:2012) (1page).
Wikipedia, https://en.wikipedia.org/wiki/Tree_(data_structure), "Tree (data structure)", May 15, 2005, entire page (Year:2005) (1page).
Response to Rule 161 Communication dated Jan. 5, 2018 in European Patent Application No. 16843282.1, (16pages).
Communication pursuant to Rules 161(2) and 162 EPC dated Jul. 26, 2017 in European Patent Application No. 16843282.1, (2pages).
Office Communication dated Apr. 4, 2018 in Canadian Patent Application No. 2,959,230, (6pages).
Supplementary Search Report dated Mar. 26, 2018 in European Patent Application No. 16843282.1-1217, (6pages).
Amendment and Response to Office Action for U.S. Appl. No. 14/462,345 dated Apr. 12, 2018, (15pages).
Response to Office Action for U.S. Appl. No. 14/553,347 dated Mar. 30, 2018, (26pages).
Advisory Action for U.S. Appl. No. 14/553,347 dated Apr. 13, 2018, (7pages).
Response and Request for Continued Examination for U.S. Appl. No. 14/553,347 dated Mar. 30, 2018, (41pages).
Amendment and Response to Office Action for U.S. Appl. No. 14/673,261 dated Apr. 23, 2018, (39pages).
Advisory Action for U.S. Appl. No. 14/673,261 dated May 14, 2018, (9pages).
Amendment and Response to Office Action for U.S. Appl. No. 14/698,733 dated Mar. 30, 2018, (39pages).
Office Action for U.S. Appl. No. 14/462,058 dated Apr. 27, 2018, (47pages).
Amendment and Response to Final and Advisory Actions and Request for Continued Examination for U.S. Appl. No. 14/448,678 dated Mar. 5, 2018, (25pages).
Amendment and Response for U.S. Appl. No. 14/555,553 dated Apr. 12, 2018, (24pages).
Advisory Action for U.S. Appl. No. 14/555,553 dated Apr. 24, 2018, (3pages).
Amendment and Response to Final Office Action and Request for Continued Examination for U.S. Appl. No. 14/555,553 dated May 11, 2018, (25pages).
Amendment and Response for U.S. Appl. No. 14/529,798 dated Mar. 28, 2018, (23pages).
Response for U.S. Appl. No. 14/755,684 dated Mar. 12, 2018, (23pages).
Advisory Action for U.S. Appl. No. 14/755,684 dated Mar. 30, 2018, (2pages).
Response for U.S. Appl. No. 14/755,684 dated Apr. 4, 2018, (23pages).
Office Action for U.S. Appl. No. 14/555,902 dated May 17, 2018, (23pages).
Response for U.S. Appl. No. 14/207,121 dated Mar. 19, 2018, (34pages).
Advisory Action for U.S. Appl. No. 14/207,121 dated Apr. 6, 2018 (3pages).
Response for U.S. Appl. No. 14/462,315 dated May 9, 2018, (33pages).
Office Action for U.S. Appl. No. 14/698,746 dated Feb. 28, 2018, (14pages).
Response for U.S. Appl. No. 14/698,746 dated Apr. 30, 2018, (18pages).
Advisory Action for U.S. Appl. No. 14/698,746 dated May 15, 2018, (3pages).
Response for U.S. Appl. No. 14/462,397 dated Feb. 20, 2018, (33pages).
Response for U.S. Appl. No. 14/462,373 dated Feb. 28, 2018, (25pages).
Office Action for U.S. Appl. No. 14/755,859 dated Mar. 21, 2018, (57pages).
Response for U.S. Appl. No. 14/755,859 dated May 21, 2018, (8pages).
Response for U.S. Appl. No. 14/448,886 dated Feb. 28, 2018, (31pages).
Amendment for U.S. Appl. No. 14/448,922 dated Feb. 28, 2018, (27pages).

(56) References Cited

OTHER PUBLICATIONS

Office Action for U.S. Appl. No. 14/448,922 dated May 16, 2018, (41pages).
Office Action for U.S. Appl. No. 14/448,962 dated Apr. 13, 2018, (17pages).
Office Action for U.S. Appl. No. 14/448,986 dated May 11, 2018, (15pages).
Response for U.S. Appl. No. 14/462,411 dated May 8, 2018, (27pages).
Response for U.S. Appl. No. 14/555,334 dated Apr. 4, 2018, (14pages).
Advisory Action for U.S. Appl. No. 14/555,334 dated Apr. 17, 2018, (2pages).
Response for U.S. Appl. No. 14/555,334 dated May 7, 2018, (41pages).
Office Action for U.S. Appl. No. 14/673,646 dated Feb. 28, 2018, (19pages).
Response for U.S. Appl. No. 14/673,646 dated Mar. 30, 2018, (22pages).
Response for U.S. Appl. No. 14/701,087 dated Apr. 2, 2018, (41pages).
Amendment After Allowance for U.S. Appl. No. 14/675,166, (5pages).
Supplemental Notice of Allowability for U.S. Appl. No. 14/675,166, (3pages).
Response for U.S. Appl. No. 14/555,296, (23pages).
Response for U.S. Appl. No. 14/555,222, (8pages).
Office Action for U.S. Appl. No. 14/700,981, (28pages).
Office Action for U.S. Appl. No. 14/673,555, (43pages).
H.R. Gregg; Decision Tables for Documentation and System Analysis; Oct. 3, 1967; Union Carbide Corporation, Nuclear Division, Computing Technology Center: pp. 5, 6, 18, 19, & 21 (Year: 1967).
Solomon L. Pollack; Analysis of the Decision Rules in Decision Tables, May 1963; The Rand Corooration; pp. iii, iv, 1, 20, & 24 (Year: 1963).
Communication pursuant to Rules 70(2) and 70a(2) EPC dated Apr. 25, 2018 in European Patent Application No. 16843282.1-1217, (1page).
Office Action dated Nov. 17, 2016 in U.S. Appl. No. 14/448,922, filed Jul. 31, 2014, inventor: Gang Wang.
Amendment dated Feb. 17, 2016 in U.S. Appl. No. 14/448,922, filed Jul. 31, 2014, inventor: Gang Wang.
Office Action dated Apr. 6, 2017 in U.S. Appl. No. 14/448,922, filed Jul. 31, 2014, inventor: Gang Wang.
Office Action dated Aug. 11, 2016 in U.S. Appl. No. 14/448,962, filed Jul. 31, 2014, inventor: Gang Wang.
Amendment dated Nov. 11, 2016 in U.S. Appl. No. 14/448,962, filed Jul. 31, 2014, inventor: Gang Wang.
Office Action dated Jan. 13, 2017 in U.S. Appl. No. 14/448,962, filed Jul. 31, 2014, inventor: Gang Wang.
Office Action dated Aug. 23, 2016 in U.S. Appl. No. 14/448,986, filed Jul. 31, 2014, inventor: Gang Wang.
Response dated Jan. 23, 2017 in U.S. Appl. No. 14/448,986, filed Jul. 31, 2014, inventor: Gang Wang.
Office Action dated Feb. 17, 2017 in U.S. Appl. No. 14/448,986, filed Jul. 31, 2014, inventor: Gang Wang.
Office Action dated Jan. 12, 2017 in U.S. Appl. No. 14/462,411, filed Aug. 18, 2014, inventor: Gang Wang.
Office Action dated Feb. 7, 2017 in U.S. Appl. No. 14/555,543, filed Nov. 26, 2014, inventor: Gang Wang.
PCT International Search Report for PCT/US2016/039919, Applicant: Intuit Inc., Form PCT/ISA/210 and 220, dated Oct. 11, 2016.
PCT Written Opinion of the International Search Authority for PCT/US2016/039919, Applicant: Intuit Inc., Form PCT/ISA/237, dated Oct. 11, 2016.
PCT International Search Report for PCT/US2016/039917, Applicant: Intuit Inc., Form PCT/ISA/210 and 220, dated Oct. 11, 2016.
PCT Written Opinion of the International Search Authority for PCT/US2016/039917, Applicant: Intuit Inc., Form PCT/ISA/237, dated Oct. 11, 2016.

PCT International Search Report for PCT/US2016/039918, Applicant: Intuit Inc., Form PCT/ISA/210 and 220, dated Oct. 11, 2016.
PCT Written Opinion of the International Search Authority for PCT/US2016/039918, Applicant: Intuit Inc., Form PCT/ISA/237, dated Oct. 11, 2016.
PCT International Search Report for PCT/US2016/039913, Applicant: Intuit Inc., Form PCT/ISA/210 and 220, dated Oct. 21, 2016.
PCT Written Opinion of the International Search Authority for PCT/US2016/039913, Applicant: Intuit Inc., Form PCT/ISA/237, dated Oct. 21, 2016.
PCT International Search Report for PCT/US2016/039916, Applicant: Intuit Inc., Form PCT/ISA/210 and 220, dated Oct. 11, 2016.
PCT Written Opinion of the International Search Authority for PCT/US2016/039916, Applicant: Intuit Inc., Form PCT/ISA/237, dated Oct. 11, 2016.
http://en.wikipedia.org/wiki/Dependency_grammar#Semantic_dependencies, printed Mar. 11, 2014.
http://www.webopedia.com/TERM/L/loose_coupling.html, printed Mar. 11, 2014.
http://en.wikipedia.org/wiki/Loose_coupling, printed Mar. 11, 2014.
www.turbotax.com, printed Mar. 11, 2014.
https://turbotax.intuit.com/snaptax/mobile/, printed Mar. 11, 2014.
http://www.jboss.org/drools/drools-expert.html, printed Mar. 11, 2014.
http://en.wikipedia.org/wiki/Drools, printed Mar. 11, 2014.
http://en.wikipedia.org/wiki/Declarative_programming, printed Mar. 11, 2014.
http://www.wisegeek.com/what-is-declarative-programming.htm, printed Mar. 11, 2014.
http://docs.jboss.org/drools/release/5.3.0.Final/drools-expert-docs/html/ch01.html, printed Mar. 11, 2014.
http://quicken.intuit.com/support/help/tax-savings/simplify-tax-time/INF24047.html, updated Jul. 25, 2013, printed Jun. 24, 2014 (11 pages).
http://quicken.intuit.com/support/help/income-and-expenses/how-to-assign-tax-form-line-items-to-a-category/GEN82142.html, updated Aug. 11, 2011, printed Jun. 24, 2014 (2 pages).
http://quicken.intuit.com/support/help/reports--graphs-and-snapshots/track-the-earnings--taxes--deductions--or-deposits-from-paychecks/GEN82101.html, updated May 14, 2012, printed Jun. 24, 2014 (2 pages).
NY State Dep of Taxation, NY State Personal Income Tax MeF Guide for Software Developers, 2012, NY State.
Restriction Requirement dated May 22, 2015 in U.S. Appl. No. 14/097,057, filed Dec. 4, 2013, inventor: Gang Wang.
Response dated Jun. 30, 2015 in U.S. Appl. No. 14/097,057, filed Dec. 4, 2013, inventor: Gang Wang.
Office Action dated Oct. 2, 2015 in U.S. Appl. No. 14/097,057, filed Dec. 4, 2013, inventor: Gang Wang.
Response dated Feb. 29, 2016 in U.S. Appl. No. 14/097,057, filed Dec. 4, 2013, inventor: Gang Wang.
Final Office Action dated Apr. 8, 2016 in U.S. Appl. No. 14/097,057, filed Dec. 4, 2013, inventor: Gang Wang.
Pre-Appeal Brief dated Jun. 24, 2016 in U.S. Appl. No. 14/097,057, filed Dec. 4, 2013, inventor: Gang Wang.
Pre-Appeal Brief Conference Decision dated Aug. 15, 2016 in U.S. Appl. No. 14/097,057, filed Dec. 4, 2013, inventor Gang Wang.
Amendment dated Sep. 13, 2016 in U.S. Appl. No. 14/097,057, filed Dec. 4, 2013, inventor: Gang Wang.
Office Action dated Nov. 4, 2016 in U.S. Appl. No. 14/097,057, filed Dec. 4, 2013, inventor: Gang Wang.
Amendment dated Feb. 6, 2017 in U.S. Appl. No. 14/097,057, filed Dec. 4, 2013, inventor: Gang Wang.
Final Rejection dated Mar. 9, 2017 in U.S. Appl. No. 14/097,057, filed Dec. 4, 2013, inventor: Gang Wang.
Office Action dated Dec. 23, 2016 in U.S. Appl. No. 14/462,345, filed Aug. 18, 2014, inventor: Gang Wang.
Amendment dated Mar. 23, 2017 in U.S. Appl. No. 14/462,345, filed Aug. 18, 2014, inventor: Gang Wang.
Office Action dated Mar. 10, 2017 in U.S. Appl. No. 14/448,678, filed Jul. 31, 2014, inventor: Gang Wang.
Office Action dated Jul. 8, 2015 in U.S. Appl. No. 14/206,682, filed Mar. 12, 2015, inventor: Gang Wang.

(56) References Cited

OTHER PUBLICATIONS

Response dated Aug. 31, 2015 in U.S. Appl. No. 14/206,682, filed Mar. 12, 2015, inventor: Gang Wang.
Office Action dated Mar. 9, 2016 in U.S. Appl. No. 14/206,682, filed Mar. 12, 2015, inventor: Gang Wang.
Amendment dated Jul. 11, 2016 in U.S. Appl. No. 14/206,682, filed Mar. 12, 2015, inventor: Gang Wang.
Office Action dated Sep. 16, 2016 in U.S. Appl. No. 14/206,682, filed Mar. 12, 2015, inventor: Gang Wang.
Amendment dated Jan. 13, 2017 in U.S. Appl. No. 14/206,682, filed Mar. 12, 2015, inventor: Gang Wang.
Office Action dated Dec. 31, 2015 in U.S. Appl. No. 14/206,834, filed Mar. 12, 2015, inventor: Gang Wang.
Amendment dated May 31, 2016 in U.S. Appl. No. 14/206,834, filed Mar. 12, 2015, inventor: Gang Wang.
Office Action dated Sep. 6, 2016 in U.S. Appl. No. 14/206,834, filed Mar. 12, 2015, inventor: Gang Wang.
Amendment dated Jan. 6, 2017 in U.S. Appl. No. 14/206,834, filed Mar. 12, 2015, inventor: Gang Wang.
Office Action dated Apr. 30, 2015 in U.S. Appl. No. 14/207,121, filed Mar. 12, 2015, inventor: Gang Wang.
Response dated Apr. 30, 2015 in U.S. Appl. No. 14/207,121, filed Mar. 12, 2015, inventor: Gang Wang.
Office Action dated Jul. 30, 2015 in U.S. Appl. No. 14/207,121, filed Mar. 12, 2015, inventor: Gang Wang.
Response dated Nov. 30, 2015 in U.S. Appl. No. 14/207,121, filed Mar. 12, 2015, inventor: Gang Wang.
Office Action dated Apr. 29, 2016 in U.S. Appl. No. 14/207,121, filed Mar. 12, 2015, inventor: Gang Wang.
Amendment dated Aug. 29, 2016 in U.S. Appl. No. 14/207,121, filed Mar. 12, 2015, inventor: Gang Wang.
Office Action dated Dec. 14, 2016 in U.S. Appl. No. 14/462,315, filed Aug. 18, 2014, inventor: Gang Wang.
Response dated Mar. 14, 2017 in U.S. Appl. No. 14/462,315, filed Aug. 18, 2014, inventor: Gang Wang.
Office Action dated Mar. 21, 2017 in U.S. Appl. No. 14/448,481, filed Jul. 31, 2014, inventor: Gang Wang.
Office Action dated Nov. 29, 2016 in U.S. Appl. No. 14/448,886, filed Jul. 31, 2014, inventor: Gang Wang.
Amendment dated Feb. 28, 2017 in U.S. Appl. No. 14/448,886, filed Jul. 31, 2014, inventor: Gang Wang.
Office Action dated Apr. 20, 2017 in US. Appl. No. 14/448,886, filed Jul. 31, 2014, inventor: Gang Wang.
Final Office Action dated Jun. 6, 2017 in U.S. Appl. No. 14/462,411, (20pges).
Amendment After Final Office Action dated Jun. 6, 2017 in U.S. Appl. No. 14/448,922, (8pages).
Interview Summary dated Jun. 7, 2017 in U.S. Appl. No. 14/448,922, (2pages).
Advisory Action dated Jun. 14, 2017 in U.S. Appl. No. 14/448,922, (4pages).
Amendment After Final Office Action dated Jun. 20, 2017 in U.S. Appl. No. 14/448,922, (14pages).
Office Action dated May 26, 2017 in U.S. Appl. No. 14/553,347, (43pages).
Office Action dated Jun. 2, 2017 in U.S. Appl. No. 14/673,261, (65pages).
Office Action dated May 25, 2017 in U.S. Appl. No. 14/529,736, (42pages).
Office Action dated Jun. 6, 2017 in U.S. Appl. No. 14/462,315, (54pages).
Amendment and Response dated Jun. 2, 2017 in U.S. Appl. No. 14/448,986, (12pages).
Interview Summary dated Jun. 2, 2017 in U.S. Appl. No. 14/448,986, (3pages).
Office Action dated Jun. 7, 2017 in U.S. Appl. No. 14/555,334, (54pages).
Office Action dated Jun. 7, 2017 in U.S. Appl. No. 14/555,296, (7pages).
Response dated Jun. 7, 2017 in U.S. Appl. No. 14/555,543, (21pages).
Amendment dated Jun. 9, 2017 in U.S. Appl. No. 14/097,057, (26pages).
Office Action dated Jun. 22, 2017 in U.S. Appl. No. 14/698,746, (50pages).
Response to Restriction Requirement dated Jul. 5, 2017 in U.S. Appl. No. 14/555,902, (12pages).
PCT International Search Report for PCT/US2016/067866 Applicant: Intuit Inc., Form PCT/ISA/210 and 220, dated Jul. 26, 2017 (5pages).
PCT Written Opinion of the International Search Authority for PCT/US2016/067866, Applicant: Intuit Inc., Form PCT/ISA/237, dated Jul. 26, 2017 (4pages).
PCT International Search Report for PCT/US2016/067867 Applicant: Intuit Inc., Form PCT/ISA/210 and 220, dated Jul. 26, 2017 (5pages).
PCT Written Opinion of the International Search Authority for PCT/US2016/067867, Applicant: Intuit Inc., Form PCT/ISA/237, dated Jul. 26, 2017 (9pages).
Response to Office Action dated Jul. 17, 2017 in U.S. Appl. No. 14/462,345, (17pages).
Advisory Action dated Jul. 31, 2017 in U.S. Appl. No. 14/462,345, (3pages).
Request for Continued Examination and Response dated Aug. 14, 2017 in U.S. Appl. No. 14/462,345, (17pages).
Office Action dated Aug. 9, 2017 in U.S. Appl. No. 14/097,057, (47pages).
Interview Summary dated Sep. 6, 2017 in U.S. Appl. No. 14/553,347, (2pages).
Response dated Aug. 15, 2017 in U.S. Appl. No. 14/698,733, (24pages).
Response dated Aug. 10, 2017 in U.S. Appl. No. 14/448,678, (41pages).
Office Action dated Jul. 28, 2017 in U.S. Appl. No. 14/555,553, (52pages).
Office Action dated Aug. 21, 2017 in U.S. Appl. No. 14/755,684, (43pages).
Response dated Jul. 5, 2017 in U.S. Appl. No. 14/555,902, (12pages).
Office Action dated Sep. 8, 2017 in U.S. Appl. No. 14/555,939, (92pages).
Office Action dated Jun. 28, 2017 in U.S. Appl. No. 14/207,121, (29pages).
Office Action dated Sep. 14, 2017 in U.S. Appl. No. 14/557,335, (57pages).
Response dated Aug. 7, 2017 in U.S. Appl. No. 14/462,315, (10pages).
Advisory Action dated Aug. 24, 2017 in U.S. Appl. No. 14/462,315, (3pages).
Request for Examination and Response dated Sep. 6, 2017 in U.S. Appl. No. 14/462,315, (43pages).
Office Action dated Jun. 27, 2017 in U.S. Appl. No. 14/755,859, (174pages).
Advisory Action dated Jul. 5, 2017 in U.S. Appl. No. 14/448,922, (4pages).
Request for Continued Examination and Amendment dated Aug. 21, 2017 in U.S. Appl. No. 14/448,922, (37pages).
Request for Continued Examination and Amendment dated Sep. 6, 2017 in U.S. Appl. No. 14/448,922, (36pages).
Request for Continued Examination and Amendment dated Sep. 6, 2017 in U.S. Appl. No. 14/462,411, (24pages).
Office Action dated Aug. 25, 2017 in U.S. Appl. No. 14/673,646, (65pages).
Office Action dated Jun. 27, 2017 in U.S. Appl. No. 14/675,166, (46pages).
Response dated Jun. 23, 2017 in U.S. Appl. No. 14/555,293, (7pages).
Office Action dated Jul. 10, 2017 in U.S. Appl. No. 14/555,222, (63pages).
Office Action dated Aug. 18, 2017 in U.S. Appl. No. 14/555,543, (42pages).
Office Action dated Aug. 25, 2017 in U.S. Appl. No. 14/673,555, (71pages).
Response dated Sep. 21, 2017 in U.S. Appl. No. 14/448,481, (44pages).

(56) References Cited

OTHER PUBLICATIONS

Office Action dated Sep. 14, 2017 in U.S. Appl. No. 14/530,159, (41pages).
Amendment and Response dated Nov. 9, 2017 in U.S. Appl. No. 14/097,057, (31pgs.).
Amendment and Response dated Oct. 26, 2017 in U.S. Appl. No. 14/553,347, (25pgs.).
Amendment and Response dated Nov. 2, 2017 in U.S. Appl. No. 14/673,261, (30pgs.).
Office Action dated Oct. 30, 2017 in U.S. Appl. No. 14/448,678, (39pgs.).
Amendment and Response dated Oct. 30, 2017 in U.S. Appl. No. 14/555,553, (17pgs.).
Notice of Allowance dated Nov. 3, 2017 in U.S. Appl. No. 14/529,736, (13pgs.).
Interview Summary dated Sep. 28, 2017 in U.S. Appl. No. 14/529,736, (3pgs.).
Office Action dated Sep. 14, 2017 in U.S. Appl. No. 14/530,159, (41pgs.).
Amendment and Response dated Nov. 21, 2017 in U.S. Appl. No. 14/755,684, (23pgs.).
Office Action dated Nov. 15, 2017 in U.S. Appl. No. 14/206,834, (100pgs.).
Office Action dated Sep. 8, 2017 in U.S. Appl. No. 14/555,939, (92pgs.).
Amendment and Response dated Sep. 28, 2017 in U.S. Appl. No. 14/207,121, (38pgs.).
Office Action dated Sep. 14, 2017 in U.S. Appl. No. 14/557,335, (57pgs.).
Amendment and Response dated Aug. 7, 2017 in U.S. Appl. No. 14/462,315, (10pgs.).
Advisory Action dated Aug. 24, 2017 in U.S. Appl. No. 14/462,315, (3pgs.).
Amendment and Response and Request for Continued Examination dated Sep. 6, 2017 in U.S. Appl. No. 14/462,315, (43pgs.).
Amendment and Response dated Sep. 21, 2017 in U.S. Appl. No. 14/448,481, (44pgs.).
Office Action dated Jun. 22, 2017 in U.S. Appl. No. 14/698,746, (50pgs.).
Amendment and Response dated Sep. 22, 2017 in U.S. Appl. No. 14/698,746, (26pgs.).
Office Action dated Oct. 13, 2017 in U.S. Appl. No. 14/462,397, (72pgs.).
Office Action dated Nov. 30, 2017 in U.S. Appl. No. 14/462,373, (72pgs.).
Office Action dated Jun. 27, 2017 in U.S. Appl. No. 14/755,859, (174pgs.).
Amendment and Response dated Nov. 27, 2017 in U.S. Appl. No. 14/755,859, (53pgs.).
Amendment and Response dated Jun. 20, 2017 in U.S. Appl. No. 14/448,886, (14pgs.).
Advisory Action dated Jul. 5, 2017 in U.S. Appl. No. 14/448,886, (4pgs.).
Amendment and Response dated Aug. 21, 2017 in U.S. Appl. No. 14/448,886, (37pgs.).
Office Action dated Nov. 28, 2017 in U.S. Appl. No. 14/448,886, (65pgs.).
Amendment and Response and Request for Continued Examination dated Sep. 6, 2017 in U.S. Appl. No. 14/448,922, (36pgs.).
Office Action dated Nov. 28, 2017 in U.S. Appl. No. 14/448,922, (65pgs.).
Office Action dated Oct. 10, 2017 in U.S. Appl. No. 14/448,962, (27pgs.).
Office Action dated Oct. 16, 2017 in U.S. Appl. No. 14/448,986, (30pgs.).
OpenRules, Preparing a Tax Return Using OpenRules Dialog, Aug. 2011 (Year: 2011) (25pgs.).
Amendment and Response and Request for Continued Examination dated Sep. 6, 2017 in U.S. Appl. No. 14/462,411, (24pgs.).
Amendment and Response dated Nov. 7, 2017 in U.S. Appl. No. 14/555,334, (26pgs.).
Advisory Action dated Nov. 22, 2017 in U.S. Appl. No. 14/555,334, (2pgs.).
Office Action dated Oct. 11, 2017 in U.S. Appl. No. 14/701,030, (53pgs.).
Office Action dated Aug. 25, 2017 in U.S. Appl. No. 14/673,646, (65pgs.).
Office Action dated Jul. 10, 2017 in U.S. Appl. No. 14/555,222, (63pgs.).
Amendment and Response dated Nov. 10, 2017 in U.S. Appl. No. 14/555,222, (25pgs.).
Office Action dated Nov. 3, 2017 in U.S. Appl. No. 14/701,087, (103pgs.).
Office Action dated Jun. 27, 2017 in U.S. Appl. No. 14/675,166, (46pgs.).
Amendment and Response dated Oct. 27, 2017 in U.S. Appl. No. 14/675,166, (25pgs.).
Response dated Jun. 23, 2017 in U.S. Appl. No. 14/555,296, (7pgs.).
Office Action dated Oct. 20, 2017 in U.S. Appl. No. 14/555,296, (50pgs.).
Office Action dated Aug. 18, 2017 in U.S. Appl. No. 14/555,543, (42pgs.).
Interview Summary dated Oct. 25, 2017 in U.S. Appl. No. 14/555,543, (3pgs.).
Office Action dated Sep. 25, 2017 in U.S. Appl. No. 14/700,981, (52pgs.).
Office Action dated Aug. 25, 2017 in U.S. Appl. No. 14/673,555, (65pgs.).
Office Action dated Sep. 28, 2017 in U.S. Appl. No. 14/701,149, (71pgs.).
Vanderbilt University, "Free tax prep help available for Vanderbilt employees", Feb. 6, 2014, Vanderbilt University, p. 1-3 [NPL-1].

\* cited by examiner

| | $Q_A$ | $Q_B$ | $Q_C$ | $Q_D$ | $Q_E$ | $Q_F$ | $Q_G$ | STAT1 | STAT2 |
|---|---|---|---|---|---|---|---|---|---|
| Rule$_1$ | Y | ? | ? | ? | N | ? | ? | 40% | 10% |
| Rule$_2$ | N | Y | Y | ? | ? | ? | N | 20% | 5% |
| Rule$_3$ | N | Y | N | Y | ? | N | ? | 14% | 6% |
| Rule$_4$ | Y | ? | ? | ? | N | Y | N | 65% | 20% |
| Rule$_5$ | N | Y | N | ? | ? | ? | Y | 18% | 40% |
| Rule$_6$ | Y | Y | N | ? | ? | N | ? | 5% | 25% |

FIG. 9B

| | A | B | C | D | E | F | G | Goal |
|---|---|---|---|---|---|---|---|---|
| R1 | Y | ? | N | ? | ? | ? | ? | Yes |
| R2 | Y | ? | Y | ? | ? | ? | Y | Yes |
| R3 | N | Y | ? | ? | Y | ? | Y | Yes |
| R4 | N | Y | ? | ? | N | N | ? | Yes |
| R5 | N | N | ? | N | ? | N | ? | Yes |

Columns (Questions 462)
(Rows) (Rules 461)
460
Cross Out Since Answer to Question A is "yes" 1010

COMPUTERIZED TAX RETURN PREPARATION SYSTEM AND COMPUTER GENERATED USER INTERFACES FOR TAX TOPIC COMPLETION STATUS MODIFICATIONS

SUMMARY

Embodiments are related to determining tax topics or questions thereof to present to a user of a computerized tax return preparation systems based at least in part upon tax topic completion status changes given runtime data iterations, updates or modifications and specifically addressing real-time notifications involving a tax return topic that was previously complete but is currently incomplete due to runtime data changes.

Embodiments are also related to computerized tax return preparation systems that automatically present notifications regarding a tax return topic that was previously complete but is currently incomplete due to runtime data changes during preparation of an electronic tax return, before a final error check, and without requiring user input to check whether additional input is needed in order to complete the electronic tax return.

Embodiments are also related to user interfaces or interview screens generated by computerized tax return preparation system and presented to a user through a display of the user's computing apparatus. User interfaces or interview screens generated according to embodiments provide for on the fly modification or transformation of user interfaces and user experiences during preparation of electronic tax returns. User interfaces or interview screens generated according to embodiments are based at least in part upon tax topic completion status changes given runtime data updates or modifications. User interfaces or interview screens generated according to embodiments are presented, for example, in response to detection of a tax return topic that was previously complete being currently incomplete due to changes or updates to electronic tax return data, and can be presented upon detection or in response to detection of the completion status modification. User interface elements may be encoded to indicate how many previously complete but currently incomplete topics require user attention and/or how many questions thereof require user attention. The user is directed to interview screens or a sequence thereof for these previously complete but currently incomplete topics via one or more clickable software links or interface buttons.

Embodiments are also related to user interactions and user experiences with computer generated interfaces during preparation of electronic tax returns, and in particular, user interactions and user experiences triggered by changes to electronic tax return data, which may involve ad hoc addition, deletion, modification or importation of electronic tax return data and associated tax topic completion status modifications.

Embodiments are also related to user interface elements and encoding of same for tax return topics that were previously complete but are currently incomplete.

Embodiments are also related to dynamic tax topic or question presentation to a user during preparation of an electronic tax return and are not restricted to a pre-determined question-and-answer tree or hard-coded, static interview screen/question sequences, by instead employing a modular computerized tax return preparation system and declarative elements that allow for questions and topics to be identified and presented in a substantially different manner.

Embodiments are also related to filtering, minimizing or reducing the number of questions presented to a user of an electronic tax return while identifying and processing tax topic completion status changes utilizing a modular tax return preparation system.

One embodiment is directed to a special purpose modular computing system or computerized tax engine or components thereof of a computerized tax return preparation application operable to prepare an electronic tax return, and that is configured or programmed to process a tax topic completeness modification or instance in which a previously complete tax topic is now currently incomplete as a result of electronic tax return data changes due to adding, deleting, importing or retracting or modifying electronic tax return data.

One embodiment is directed to a special-purpose modular computing system, e.g., a computerized tax engine or components thereof of a computerized tax return preparation application operable to prepare an electronic tax return. The special purpose modular computing system constructed according to one embodiment is configured or programmed to modify computer generated interview screens and user experiences and user interactions with tax return preparation applications by incorporating a dynamic completion indicator of tax topics (or questions thereof) that were previously complete but are now incomplete and require attention as a result of electronic tax return data changes. For example, an interview screen generated according to embodiments may include a user interface element such as a link or button that embodies or is associated with a message indicating "Needs Attention (X)" or "Topics Need Attention (X)" wherein "X" indicates a number of topics that were complete but are now incomplete as a result of electronic tax return data changes, or "Needs Attention (Y)" or "Questions Need Attention (Y)" wherein "Y" indicates a number of questions of one or more topics that were complete but are now incomplete as a result of electronic tax return data changes. Clicking this link by the user allows the user to jump to the referenced topics or question without restriction of a pre-determined interview screen sequence.

In a modular computing system architecture according to one embodiment, and in contrast to hard-coded tax return preparation applications that provide for a pre-determined or fixed interview screen and question sequence, a modular tax logic engine is loosely coupled to a modular interface controller, and a modular completion monitor (e.g., completion status monitor or completeness monitor) is in communication with the modular interface controller. According to one embodiment, the modular tax logic engine comprises instructions executable by a processor of a computing apparatus and is configured or programmed to receive first runtime data of the electronic tax return and identify a first tax topic that is complete, and identify a second tax topic that is incomplete based at least in part upon the first runtime data and at least one decision table derived from a directed graph. A first non-binding suggestion involving the second (incomplete) tax topic is generated by the modular tax logic engine, and the modular interface controller is configured or programmed to receive the first non-binding suggestion from the modular tax logic engine. The modular tax logic engine and the modular interface controller are structurally configured such that they are loosely coupled to each other. In other words, the modular tax logic engine's suggestions regarding questions to ask or present to the user are just that—suggestions, and are not binding on the modular interface controller. The modular interface controller may be independently controllable via a modular configuration file that may specify various processing priorities. The modular interface controller is programmed or configured to determine content of and generate a first user interface comprising a first interview screen that is presented to a user of the tax return preparation application through a display of the user's computer. The first interview screen includes first content based at least in part upon the first non-binding suggestion when the first non-binding suggestion is processed. The completion monitor is configured or programmed to determine when a completion status of that first (complete) tax topic is modified from complete to incomplete based at least in part upon the declarative knowledge base and second runtime data including a change relative to the first runtime data. The completion monitor is configured or programmed to notify the modular interface controller of the modified completion status of the first tax topic, which is configured or programmed to generate a second interface or interview screen. The second interview screen involving the first tax topic that was initially complete, but is now incomplete, includes an encoded user interface element for the previously complete and currently incomplete first tax topic. Detection of completion status changes and associated processing can be repeated for iterative runtime data modifications.

Embodiments are also directed to computer-implemented methods that are executed by a special-purpose, modular system and involve processing situations arising during preparation of an electronic tax return in which a previously completed tax topic is currently incomplete as a result of electronic tax return data changes.

Embodiments are also directed to articles of manufacture comprising computer program carriers readable by a computer processor and comprising non-transitory computer readable media embodying one or more instructions of a computerized tax return preparation application executable by the computer to process modifications of previously completed tax topics to currently incomplete tax topics as a result of electronic tax return data changes.

Embodiments are also directed to user interfaces and components thereof, and corresponding user interactions and experiences during preparation of electronic tax returns, how such user interfaces are structured, and when such user interfaces are generated and presented to a user during preparation of an electronic tax return, e.g., automatically upon detection of a completion status change, which may in some cases temporarily lock the user out of the prior screen until the current completion issues are resolved, and which may be done without a user request and before a user request for an error check which is typically performed at the end of the electronic tax return preparation process.

In a single or multiple embodiments, the modular tax logic engine operates on a declarative knowledge base. In a single or multiple embodiments, this may involve generation of a decision table including rows and columns by the system transforming a first data structure in the form of a pre-determined question-and-answer flow into a different, second data structure in the form of a directed graph, and then transforming the directed graph into a different, third data structure in the form of a decision table (such declarative data structures also referred to as a completion graph). In one embodiment, rows of the decision table define rules and columns define tax questions.

In a single or multiple embodiments, the notification generated by the modular completion monitor is independent of the non-binding suggestion such that the modular tax logic engine is configured or programmed to transmit the non-binding suggestion to the modular interface controller independently of the modular completion monitor transmitting the notification to the modular interface controller, even when the notification and the non-binding suggestion both involve the same tax topic or question. In cases in which there is a first non-binding suggestion involving the first tax topic that was previously complete but is now incomplete, and a second non-binding suggestion that does not involve the first tax topic and does not involve a previously complete tax topic, the modular interface controller may prioritize the first non-binding suggestion over the second non-binding suggestion that does not involve the first tax topic or that does not involve a tax topic which had its completion status modified from complete to incomplete.

In a single or multiple embodiments, the computing system is configured such that the modular completion monitor is in communication with the modular interface controller as well as the modular tax logic engine. With this system architecture, the modular completion monitor receives from the modular tax logic engine tax topics identified by the modular tax logic engine as being incomplete based on the first runtime data (e.g., as reflected in a non-binding suggestion), tax topics identified by the modular tax logic engine as being complete based on the first runtime data (or such complete tax topics are derived by the modular completion monitor), tax topics identified by the modular tax logic engine as being incomplete based on the second runtime data (as reflected in a non-binding suggestion), and tax topics identified by the modular tax logic engine as being complete based on the second runtime data (or such complete tax topics are derived by the modular completion monitor). The completion monitor is configured to generate or update a log of tax topic completeness and incompleteness for the first runtime data and the second runtime data. A completion status change is determined by the completion status monitor based at least in part upon the log and completion data of the current or updated runtime data and the prior runtime data.

In systems in which the completion monitor interfaces with or communicates with the modular tax logic engine, also referred to as an "intercept" configuration, the modular completion monitor can serve as an intermediary and intercept the non-binding suggestion generated by the modular tax logic engine before the non-binding suggestion is received by the modular interface controller. The modular completion monitor analyzes the non-binding suggestion to identify tax topics including the first tax topic that are identified by the modular tax logic agent as being incomplete and determines or derives tax topics that are complete based at least in part upon the incomplete tax topics of the intercepted non-binding suggestions, and then forwards the intercepted non-binding suggestion and a completion modification notification to the modular interface controller, or modifies the non-binding suggestion to append or include the separate notification or indication of a completion modification and then transmits the modified non-binding suggestion to the modular interface controller.

In a single or multiple embodiments, based on the independent completion modification notification, or the notification appended to an intercepted non-binding suggestion, the modular interface controller processes the identified previously complete and currently incomplete tax topic before other incomplete tax topics identified in one or more non-binding suggestions that were not previously complete, i.e., process incomplete tax topics that were the subject of the separate notification before incomplete tax topics that were not and were only part of a non-binding suggestion. For example, the previously complete and currently incomplete tax topic that is the subject of the completion monitor's notification can be processed immediately by the modular interface controller, thus transforming the interview screen sequencing and user experience on the fly and in a manner that is contrary to a hard-coded, pre-determined sequence of tax topics or interview screens of known tax return preparation applications, thus eliminating the need for additional user navigation and interaction with the tax return preparation application.

In a single or multiple embodiments in which a single completion change notification involves multiple previously complete and currently incomplete tax topics, or in cases in which multiple completion change notifications are generated, the modular interface controller may be further configured to determine a sequence of processing of the previously complete and currently incomplete tax topics, e.g., according to pre-determined criteria or prioritization. Pre-determined criteria or prioritization specify a processing order based on which previously complete and currently incomplete tax topic was visited by the user most recently, which previously complete and currently incomplete tax topics involves the fewest questions (such that a topic and other related topic may be changed back to "complete" most quickly), or according to sequence criteria specified within a modular configuration file for the modular interface controller and which can be modified, deleted, replaced and executed independently of the modular tax logic engine and the modular interface controller.

In a single or multiple embodiments, the second interview screen generated for a previously complete and currently incomplete tax topic identified in the notification includes a user interface element such as a button, software link or hyperlink, to an interview screen of the previously complete and currently incomplete tax topic and that is displayable on the computer screen and selectable by the user via an input device such as a mouse, touchscreen or keyboard of the user's computer. The interface element may be generated and displayed in different ways. The interface element may be located proximately to the second runtime data that caused the previously completed first tax return topic being incomplete, e.g., in response to entry of the second runtime data that caused the completion status modification. Thus, for example, the user may have just changed certain data and then in response is presented with an interface element about a previously complete topic that is now incomplete. The interface element may be integrated into the first interview screen, and both the first interview screen and the second interview screen may appear as separate windows. The first and second interview screens may be simultaneously displayed in a tile or cascade window arrangement so that the user can simultaneously view the screen with which the user was interacting and the new, second interview screen with the interface element, button or link. The first and second interview screens may be displayed in a non-overlapping or at least partially overlapping manner. According to one embodiment, the first interview screen is at least partially overlaid with the second interview screen so that it is emphasized to the user to first address the tax topic that was previously complete but became incomplete. In order to prioritize or emphasize the second interview screen and modify the interview experience, the content of the first interview screen or the underlying interview screen (in an at least partially overlapping arrangement) may also be inaccessible during display of the generated user interface element or second interview screen until the user interacts with the generated user interface element.

In a single or multiple embodiments, the completion monitor is activated or enabled to send a notification to the modular interface controller based on satisfaction of pre-determined criteria. The pre-determined criteria may be a pre-determined or minimum amount of data that has been entered into the electronic tax return, or whether certain types of data have been entered. Thus, rather than having completion notifications transmitted to the modular interface controller right away, or having the interface controller process the completion notifications right away or during the early stages of electronic tax return preparation, embodiments may be structured such that completion monitoring and/or generation, transmission or processing of notifications are triggered based on certain pre-determined criteria so that the user is not addressing completion notifications when initially entering tax return data or when there are significantly more incomplete tax topics than complete topics. For example, completion monitoring and transmission of notification messages may be triggered to be activated and execute upon completion of a broader general category of tax topics such as "Income" or "Deductions" or "Personal Information," or triggered to be activated and execute upon a more specific tax topics such as more specific income topics such as dependents, "W2" or "K1," interest income, dividend income, health insurance, housing deductions, child care deductions and charity deductions. Moreover, triggers may involve completion of a certain pre-determined combination or number of tax topics, e.g., executed in response to completion of "personal information" and "income" for at least one taxpayer (e.g., if married filing jointly), or in response to completion of at least two tax topics (e.g., personal information and W2 and housing deductions). Accordingly, it will be understood that embodiments may be configured in different ways so one or more or all of completion status monitoring, generation of notifications, transmission of notifications and processing of notifications are triggered after certain pre-determined criteria, or after completion of at least one topic, and that such topics may be defined to include one or more specific sub-topics.

Thus, embodiments provide special-purpose applications and modular systems that provide various improvements to computing systems and tax return preparation applications executed thereby during preparation of electronic tax returns. For example, embodiments provide for more efficient, adaptive and responsive tax topic and question identification and presentation without the restrictions and limitations of known "hard-coded" systems, which can reduce the amount of computing resources (e.g., one or more of processor, memory and communications resources) consumed by a computing apparatus by filtering topics or eliminating or bypassing topics or questions that would have otherwise been presented to a user by use of a declarative-based tax return preparation system. Embodiments also reduce the amount of user navigation and processing associated with locating an interview screen or question that must be answered. Embodiments provide for a more streamlined and efficient tax return preparation experience and are in contrast to "hard-coded" conventional systems that have navigation challenges, particularly considering the huge perplexity of tax topics and questions and fixed structure, which becomes even more challenging with tax data changes or retraction, and which often leads to a chain reaction of other topics that were previously complete now being incomplete and requiring attention.

Embodiments also provide for more efficient and accurate final error check processing by bringing previously complete but currently incomplete tax topics to the user's attention ahead of time or for immediate resolution. Further, embodiments provide improvements to a computing apparatus and tax return preparation application executed thereby by not only transforming how tax topics or questions are identified, but also transforming interview screens themselves and the user interactions and experience by providing an interface element such as a link or button that provides the ability to jump to an interview screen or question that must be revisited, thus eliminating additional interview screen and menu navigation by the user when attempting to locate the additional topics or questions to be addressed. Embodiments also provide improvements to computer displays and computer generated user interfaces, user interactions and user experiences while also transforming computer generated interview screens, user interactions and user experiences based on electronic tax return data modifications.

BRIEF DESCRIPTION OF THE DRAWINGS

FIG. 9B illustrates another embodiment of a decision table that incorporates statistical data that may be used for determining a likelihood or probability of an answer to a question of the decision table according to embodiments;

FIG. 10 illustrates an example of how a tax logic agent may process a decision table when determining which question to select based on a current set or iteration of runtime data;

FIGS. 16A-C illustrate examples of how interview screens generated according to embodiments include an encoded interface element that can direct the user to a topic or question that requires attention, and how selection a user interface element can direct a user to other user interface elements for more specific topics or subtopics or direct a user to questions that need to be addressed to complete a tax topic.

DETAILED DESCRIPTION OF ILLUSTRATED EMBODIMENTS

Embodiments are related to how computerized tax return preparation applications are structured according to a modular architecture (as opposed to hard-coded, pre-determined question and answer sequences) in order to adapt to changes to electronic tax return data on the fly during preparation of an electronic tax return, modify the sequence or presentation of questions or interview screens, and modify user experience during preparation of an electronic tax return by bringing previously complete topics that are now incomplete the user's attention, e.g., before a user-requested final review or error check.

Tax topics or questions thereof that were previously complete but that are now incomplete due to electronic tax return data changes (e.g., adding, deleting or changing tax return data) are identified and presented to the user during preparation of the electronic tax return. These completion modification may be detected immediately or upon entry of the data that caused the previously complete but currently complete tax topic to ensure that these tax topics, which the user may erroneously believe have been completed and were completed before electronic tax return data changes, are presented to the user again. When the user clicks on a generated interface element for this completion change, the user can jump directly to the interview screen, topic or question that needs to be revisited, without the restrictions of hard-coded pre-determined interview sequences and without requiring the user to engage in unnecessary navigation or searches.

This unique system architecture and processing not only quickly adapts to data changes and ad hoc data entry but also transforms how tax topics or questions are identified, and transform interview screens themselves and the user interactions and experience with the tax return preparation application user interface, which provides a direct link or button that a user can select via a mouse or other input element to be directed to the tax topics or questions that must be revisited without having to go through the pains of navigating various other screens, menus and sub-menus searching for the form or screen to update. Embodiments also indicate a magnitude of how much additional work or review will be required, e.g., by determining and including a number of topics and/or questions that must be revisited and including the determined numbers in the generated user interface element.

Figure 1:
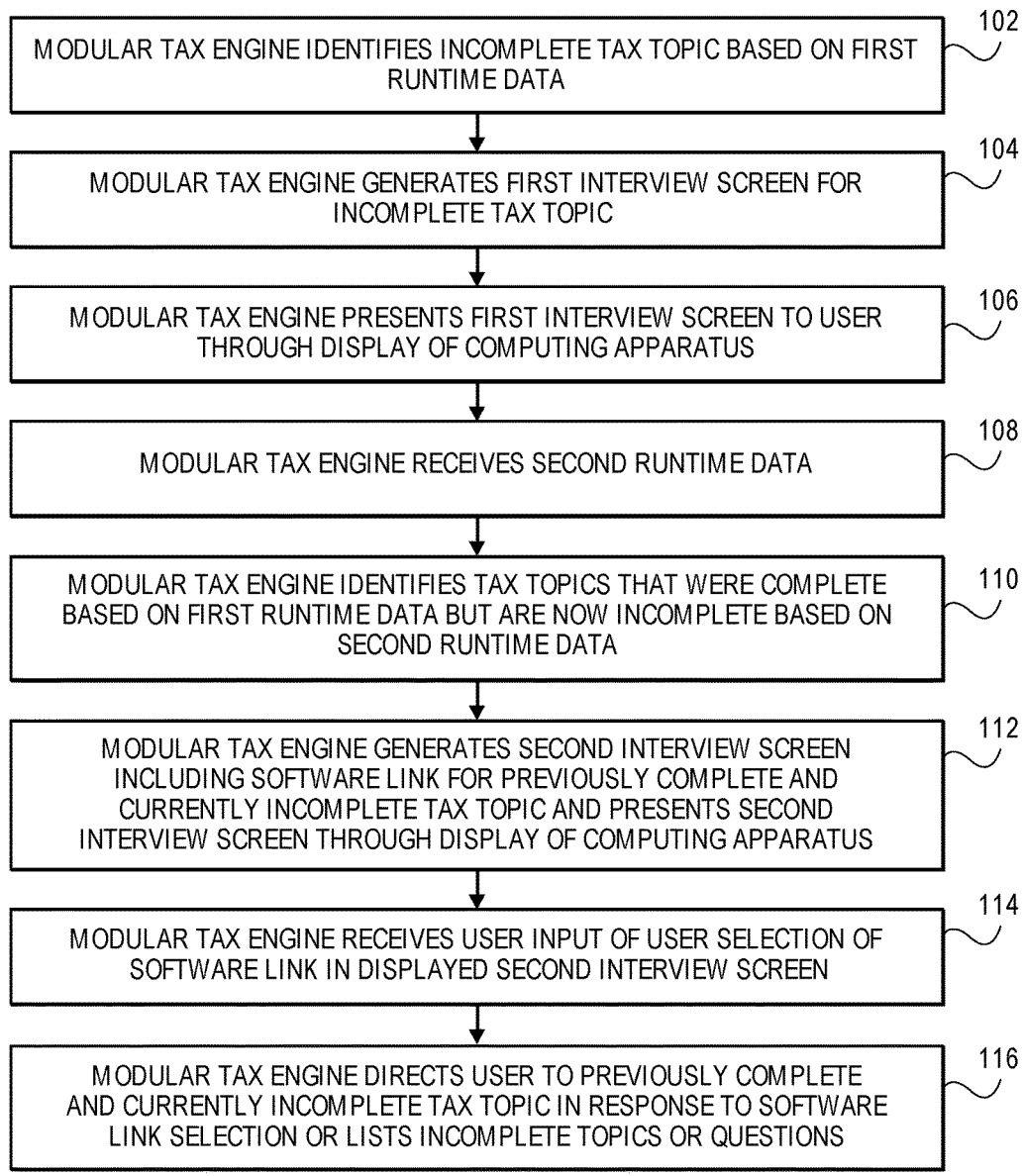
FIG. 1 is a flow diagram of one embodiment of a computer-implemented algorithm for generating a user interface addressing a tax topic that was complete based on prior electronic tax return data but is currently incomplete based on current electronic tax return data.

For example, referring to FIG. 1, in one embodiment of a computer-implemented method 100 for generating a user interface in response to detection of a tax topic completeness modification comprises, at 102, a modular tax engine identifying an incomplete tax topic based on first runtime data, and at 104, generating a first interview screen for the incomplete tax topic. At 106, the modular tax engine presents the first interview screen to user through display of the user's computing apparatus and at 108, and receives second runtime data which includes at least one change relative to the first runtime data due to at least one of adding, deleting, modifying or retracting or importing data, or as a result of an executed calculation. At 110, the modular tax engine identifies tax topics that were complete based on first runtime data, but that are now incomplete based on second runtime data, and at 112, generates a second interview screen that includes an interface element such as a button or software link or hyperlink to the previously complete and currently incomplete tax topic. The second interview screen is presented to the user through the display of computing apparatus. The interface element that is generated and displayed may include the link itself and associated information about the previously complete and currently incomplete topic, such as the number of topics that must be revisited or the number of questions of one or more topics that must be answered. At 114, the modular tax engine receives user input of user selection of the user interface element or link in the displayed second interview screen, and at 116, directs the user to the previously complete and currently incomplete tax topics so that data can be provided to make the previously complete and currently incomplete tax topic complete again. The interface element may indicate a number of tax topics to be addressed and/or summaries or titles thereof. Further, in response to the user clicking the interface element, the modular tax engine may direct the user to a starting page for a tax topic, present the user with additional interface elements or links to individual pages or questions of the tax topic to be completed or present the user with a sequence of interview screens or questions needed to complete the tax topic.

An example of data changes that can be processed according to embodiments involves how runtime data of the electronic tax return can change resulting in modification of previously complete tax topics to incomplete is when the user has completed personal information for a user a spouse, two dependent children, and then enters data in sections involving health insurance. Thus, with this simplified example, the health insurance topic may be complete such that nothing in this topic requires the attention or additional data for the individuals entered into the electronic tax return. The user, however, then enters information about a third dependent child (Timmy). The modular tax engine system constructed according to embodiments detects this change of completion status for topic "health insurance" (since information about Timmy's health insurance and other tax topics such as child care deductions must be addressed) and, without the constraints of a hard-coded pre-determined interview screen or question-and-answer sequence, generates a user interface including an interface element, link or button. The link or message associated therewith may be "Needs Attention (2)" or "Provide Timmy's Health Insurance" and "Provide Timmy's Child Care Deduction" to indicate that there are topics that may have been previously completed but that need to be reviewed again by the user due to the addition of a third dependent. When the user chooses to continue with the preparation process and other interview screen or clicks on the "Needs Attention (2)" link or button to be directed to interview screens, forms or questions that require attention which may involve presenting the user with a series of interview screens for health insurance, and when that is completed, "Needs Attention (2) is decremented to "Needs Attention (1), and then presented with a series of interview screens for child care deductions, and when that is completed, "Needs Attention (1)" is decremented to "Needs Attention (0)." If the user enters data that causes other tax topics to become incomplete, the counter may be incremented from 1 to 2, and so on. The system may also be configured such that when the interface element is selected, the system displays a drop down list of sub-topics, specific interview screens or questions to be answered. Thus, embodiments present the user with the option of addressing a previously complete and currently incomplete topic out of the usual hard-coded order, and can adapt to ad hoc data entries to make on the fly completeness determinations and user interface modifications.

Figure 2:
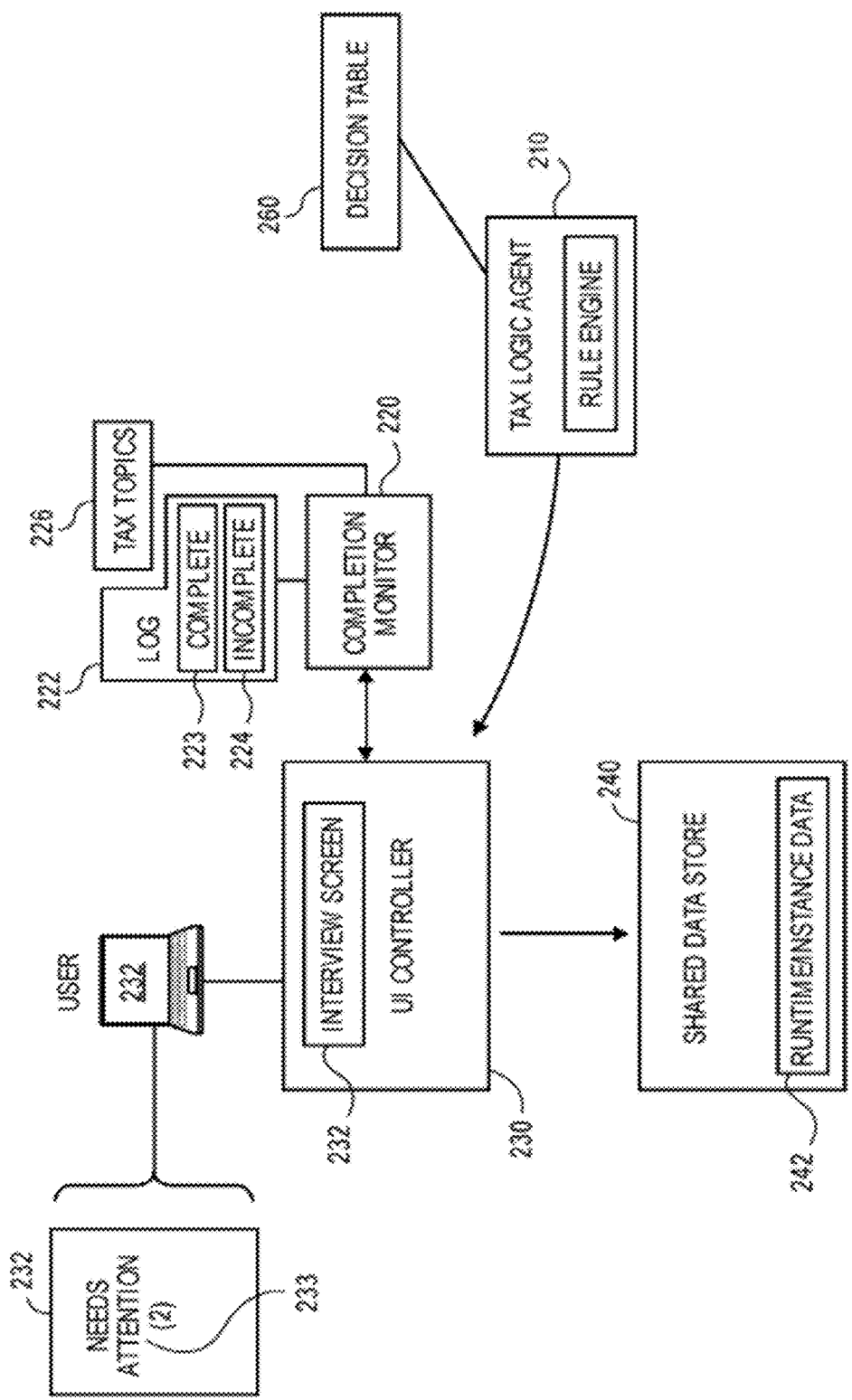
FIG. 2 is a block diagram of a computerized system constructed according to one embodiment for generating a user interface addressing a tax topic that was complete based on prior electronic tax return data but is currently incomplete based on current electronic tax return data.

Referring to FIG. 2, a special purpose modular tax return preparation system 200 constructed according to one embodiment includes a modular tax logic agent 210 comprising or executing a rule engine or processor 212 that is used to scan or analyze a declarative knowledge base including generated decision tables 260 based on runtime or instance data 242, a modular completion status or change monitor 220 (generally, completion monitor 220), a modular interface controller 230 and a modular shared data store 240. The interface controller 230 writes data to the shared data store 240 to update the runtime or instance data 242, and the tax logic engine 210 reads the current runtime or instance data 242 from the shared data store 240. In the illustrated embodiment, the completion monitor 220 is in communication with the interface controller 230 but not the tax logic engine 210. In other embodiments (as illustrated by dashed line in FIG. 2, the system 200 may be structured in an "intercept" configuration in which the completion monitor 220 is positioned between the tax logic engine 210 and the interface controller 230 to be in communication with both of the tax logic engine 210 and the interface controller 230.

Figure 3:
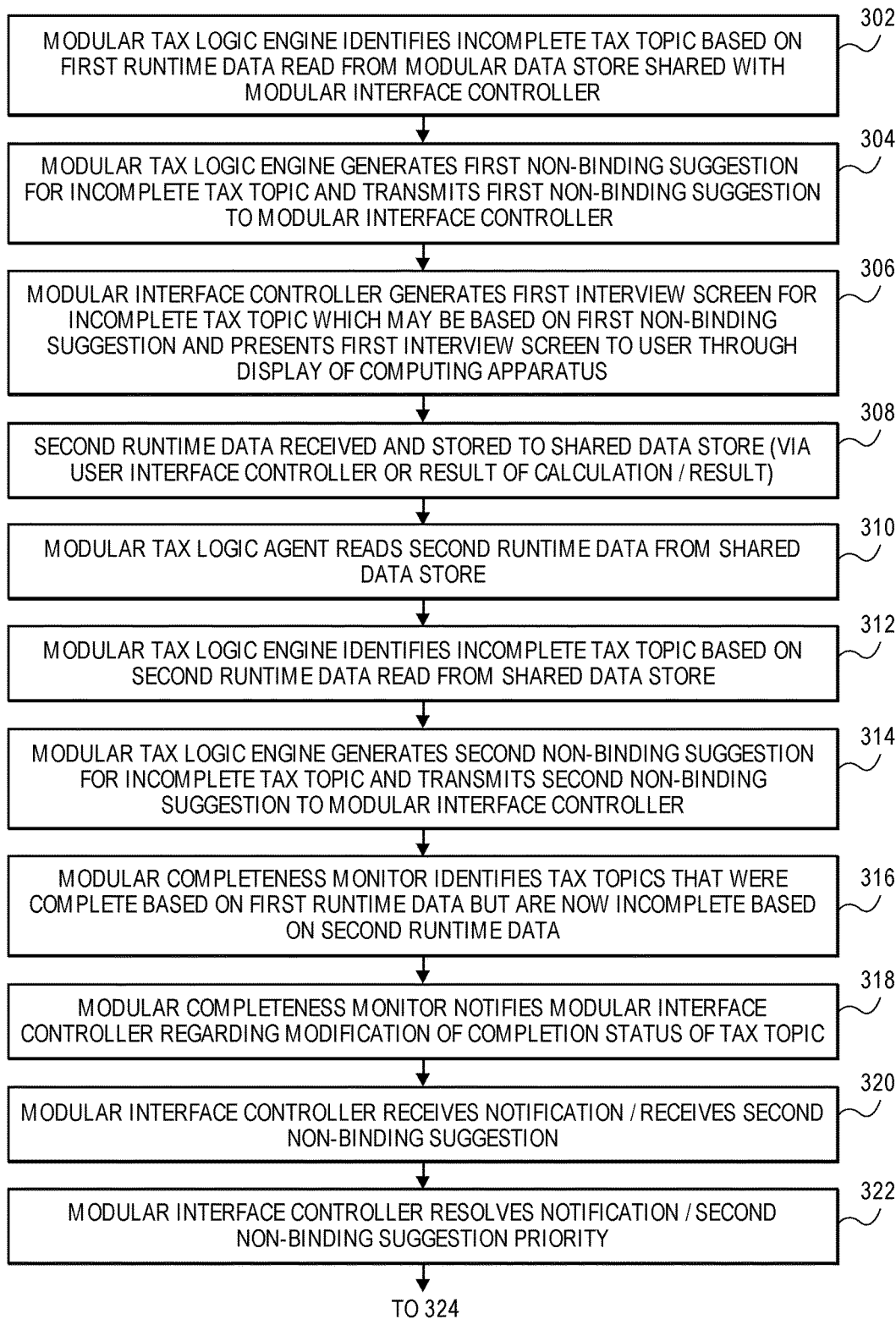
FIG. 3 is a flow diagram of one embodiment of a computer-implemented algorithm for generating a user interface addressing a tax topic that was complete based on prior electronic tax return data but is currently incomplete based on current electronic tax return data; scoring and ranking candidate questions that may be presented to a user of tax return preparation application during preparation of an electronic tax return.
Figure 3:
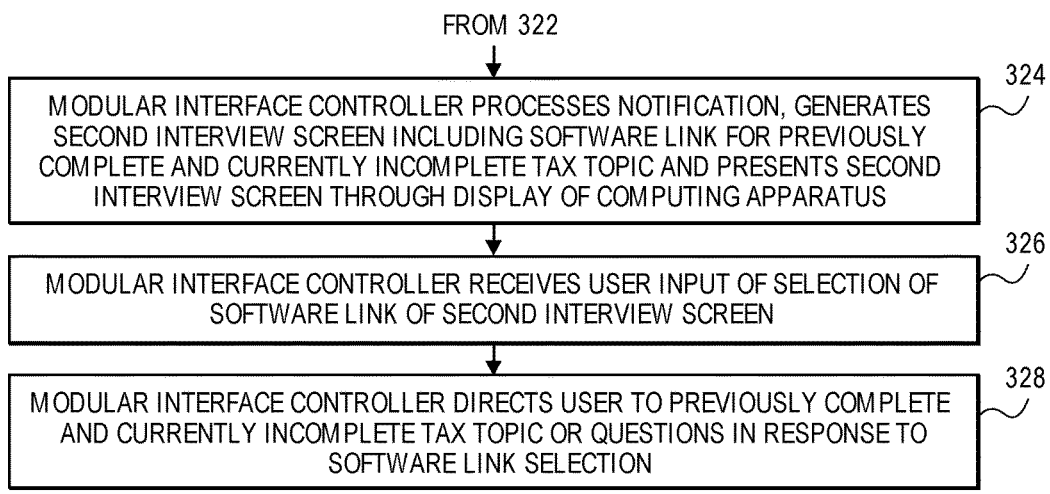

With continuing reference to FIG. 2 and with further reference to FIG. 3, at 302, the tax logic engine 210 identifies one or more incomplete tax topics based on first runtime data 242 read from the shared data store 240, and at 304, generates a first non-binding suggestion 211 for the incomplete tax topic and transmits the first non-binding suggestion 211 to the interface controller 230. At 306, the interface controller 230 receives the non-binding suggestion 211 and generates a first interview screen 232 for an incomplete tax topic that may be based on first non-binding suggestion 211 (if the interface controller 230 determines that the first non-binding suggestion 211 is processed) and presents the first interview screen 232 to the user through the display of the user's computing apparatus.

Continuing with reference to FIGS. 2-3, at 308, second or additional runtime data 242 is received and stored to the shared data store 240. For example, the user may manually enter data via a generated interview screen 232, which may be new data or a retraction or change of data, data may be imported from an electronic source, or the prior runtime data 242 may be updated with a calculation result or other new data generated as a result of other added or modified data. At 310, the tax logic engine 210 reads current or updated second runtime data from shared data store 240, identifies an incomplete tax topic based on second runtime data 242 read from the shared data store 240 and a declarative knowledge base including a decision table 260, and at 314, generates a second non-binding suggestion 211 identifying the incomplete tax topic and transmits second non-binding suggestion to modular interface controller. At 316, the completeness monitor 220 identifies tax topics that were complete 223 based on first runtime data 242 but are now incomplete 224 based on second runtime data 242. For this purpose, the completion status monitor 220 may maintain a completion log 222 and utilize a directory 226 of tax return tax topics since non-binding suggestion 211 data may involve only incomplete tax topics 224. Completion status data that is determined from the second non-binding suggestion is recorded to the log 222, and then the directory 226 can be consulted to identify other complete tax topics 223, which can also be recorded to the log 222. At 318, when there is a completion status change, the completeness monitor 220 generates a notification 221 regarding the change from a complete tax topic 223 to an incomplete tax topic 224, and the notification 221 is transmitted to the UI controller or interface controller 230. At 320, the interface controller 230 receives the notification 221, which may be after receipt of the second non-binding suggestion 211, and the interface controller 230 may wait to process the second non-binding suggestion until receiving a response from the completion monitor 220. Having both the completion status notification 221 and the second non-binding suggestion 211, both of which may involve the same incomplete tax topic or different tax topics, at 322, the interface controller 230 resolves the notification 220/second non-binding suggestion 211 priority. This may be based on which tax topic was visited most recently by the user, or which topic can be completed most quickly (e.g., fewest questions to answer). At 324, when the notification is to be processed, the user interface controller 230 processes the notification 221, generates a second interview screen 232 including an interface element 233 such as a button or link to direct the user to an interview screen or form 232 of a previously complete and currently incomplete tax topic, and presents second interview screen 232 to the user through the display of the user's computing apparatus. At 326, the user interface controller 230 receives user input of selection of the interface element presented through the second interview screen 232 and at 328, directs the user to an interview screen 232 or series of interview screens 232 involving the previously complete and currently incomplete tax topic or questions. Further details regarding embodiments are described with reference to FIGS. 4-17.

Figure 4:
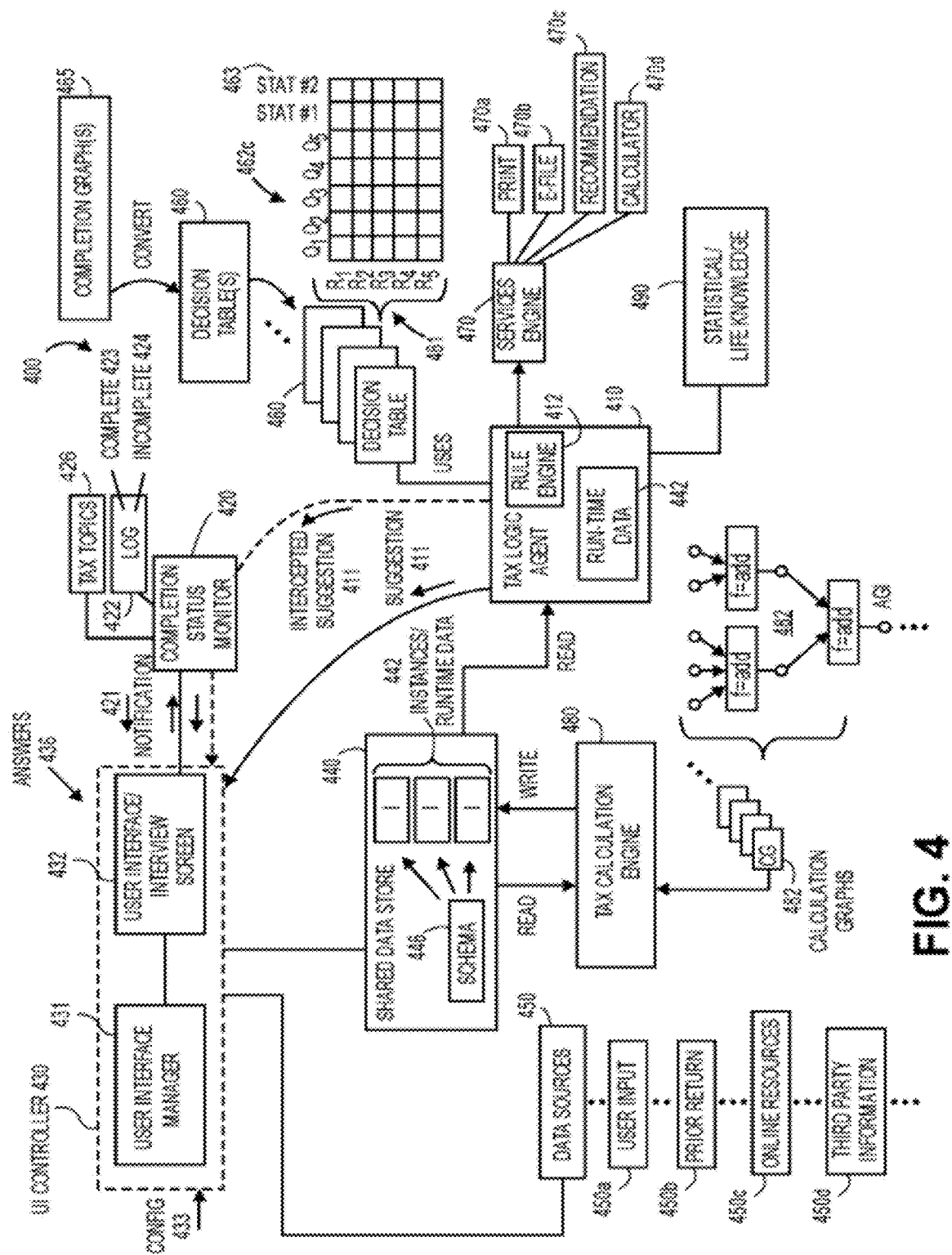
FIG. 4 is a block diagram of a computerized system constructed according to one embodiment for scoring and ranking candidate questions that may be presented to a user of tax return preparation application during preparation of an electronic tax return and illustrating a completion monitor that is in communication with an interface controller according to one system configuration and a completion monitor that is in communication with an interface controller and a tax logic agent in an intercept system configuration.

FIG. 4 is a more detailed illustration of a modular tax return preparation system 400 constructed according to one embodiment and that includes a modular tax logic agent 410, a modular completion monitor 420, a modular UI controller or interface controller 430, a modular shared data store 440 and a modular tax calculation engine 480. The tax logic agent 410 comprises or executes a rule engine or processor 412 that scans or analyzes decision tables 460 using runtime or instance data 442. The tax logic agent 410 reads runtime data 442 from the shared data store 440. The interface controller 430 and the tax calculation engine 480 are also in communication with the shared data store 440, which is shared among multiple modular components as shown in FIG. 4.

The tax logic agent 410 is operable to receive runtime or instance data 442 (generally, runtime data 442) that is defined according to a "dictionary" of terms of a data model or schema 446 (generally, schema 446). For example, the schema 446 may specify, define or list tax-related concepts or terms that are processed by the system 400, e.g., by names, type or category and hierarchy such as "name," "social security number," "citizenship," "address," "employer," "interest," "dividends," "mortgage," "deduction," "tax credit," "capital gain," etc. An instance 442 is instantiated or created for the collection of data received and for each term or topic of the schema 446. For example, there may be a first instance 442a for a first dependent, and when a user enters data for a second dependent, a separate, second instance 442b is generated for the second dependent. The schema 446 may also specify data constraints such as a certain format of questions and answers (e.g., answer is binary (Y/N) or a number/value). It will be understood that the schema 446 may define hundreds or thousands of such concepts or terms and may be defined in various ways, one example is based on an Extensible Markup Language (XML) schema. Non-limiting examples of schemas 446 that may be utilized in embodiments include Modernized E-File (MeF) and MeF++ schemas. Further, it will be understood that embodiments may utilize various other schemas, and that these schemas are provided as a non-limiting example of a schema 446 that can be utilized in embodiments.

With continuing reference to FIG. 4, runtime data 442 stored in the shared data store 440 is used to populate corresponding fields of an electronic tax return or electronic tax form used to prepare an electronic tax return and may be received from or based on data from various data sources 450a-d (generally, data source 450). Examples of data sources 450 include user input or manual entry of data into an interview screen generated by the interface controller 430, data imported from a prior year electronic tax return, data from online resources (such as online social networks or other online resources) and third parties databases or resources (such as government databases or documents, such as property tax records, Department of Motor Vehicle (DMV) records, etc. The tax logic agent 410 reads runtime data 442 from the shared data store 440 and utilizes or executes the decision table 460 based on the runtime data 442 in order to determine, based on the currently available runtime data 442, what other data or answers are still needed, and which questions or topics 462 of the decision table 460 should be presented to the user in order to obtain the needed data or answers in order to reach a state of completeness for that tax topic.

A decision table 460 of the declarative knowledge base may involve various types of rules 461. For example, "tax" rules 461 that are utilized by the rule engine 412 may specify which types of data or tax documents are required, or which fields or forms of the electronic tax return should be completed. One example is if a taxpayer is married, then the electronic tax return is required to include information about a spouse. A tax rule 461 may involve if a certain box on a form (e.g., Box 1 of Form W2) is greater than a predetermined amount, then certain fields of the electronic tax return (e.g., withholding fields) cannot be left empty and must be completed. Thus, tax rules 461 may reflect various tax requirements and are expressed using the concepts or terms of the data model or schema 446. Other rules 461 may specify tax consequences or calculations and for this purpose, the tax logic agent 410 may be in communication with other modules or services 470a-d (generally, "Additional Services" such as printing, e-filing, tax recommendations, calculation).

The decision table 460 and rules 461 thereof can used for the purpose of identifying or narrowing which questions 462 of the decision table 460 are identified as potential or candidate questions 461 that still need to be answered in order to complete a tax topic and thus are candidates to be presented to the user (without restriction of a pre-determined question-and-answer sequence). This may involve utilizing rules 461 based on one or more associated data structures such as a decision table 460, which is derived from or based on transformation of a directed graph or completion graph, which is derived from or based on transformation of a question-and-answer flow that recites, for example, requirements of a tax authority or a tax authority rules or laws. Thus, a question-and-answer flow representation of tax authority rules or laws, through multiple data structure transformations, is converted into a decision table with rows and columns that represent rules and questions, and fields of which represent answers and what is known according to the runtime data 442. With this declarative knowledge base, the decision table 460 may be used for invalidation of potential questions 461 or topics and input or runtime data 442 requirements.

Referring to FIGS. 5-9B, embodiments utilize a declarative knowledge base constructed by transformation of a question-and-answer into a completeness or directed graph 465 that reflects a flow of questions and answers of requirements, rules or laws 500 a tax authority or tax collecting entity, and that directed graph 465 is subsequently transformed into a decision table 460. Reference is made generally to a completion graph 465 or decision table 460 and to a calculation graph 482 (described with reference to FIG. 8). Aspects of these data structures are also described in U.S. application Ser. No. 14/097,057, filed Dec. 4, 2013, entitled Methods Systems and Computer Program Products for Applying Generated Rules for Personalized Interview Experience, U.S. application Ser. No. 14/755,684, filed Jun. 30, 2015, entitled Systems, Methods and Articles for Determining Tax Recommendations and U.S. application Ser. No. 14/814,239, filed Jul. 30, 2015, entitled Personalization of Responses to Queries Submitted from Within Tax Preparation Application, the contents of which are expressly incorporated by reference as though set forth herein in full.

FIGS. 5-8 illustrate graphically how tax legislation/tax rules 500 are broken down into a completeness graph 465 and a tax calculation graph 482. Tax legislation or rules 500 are parsed or broken into various topics. For example, there may be nearly one hundred topics that need to be covered for completing a federal tax return. There may be various numbers and many tax topics that need to be covered. When tax legislation or tax rules 500 are broken into various topics or sub-topics, each particular topic (e.g., topics A, B) may each have their own dedicated completeness graph 465, and tax calculation graph 482.

Figure 5:
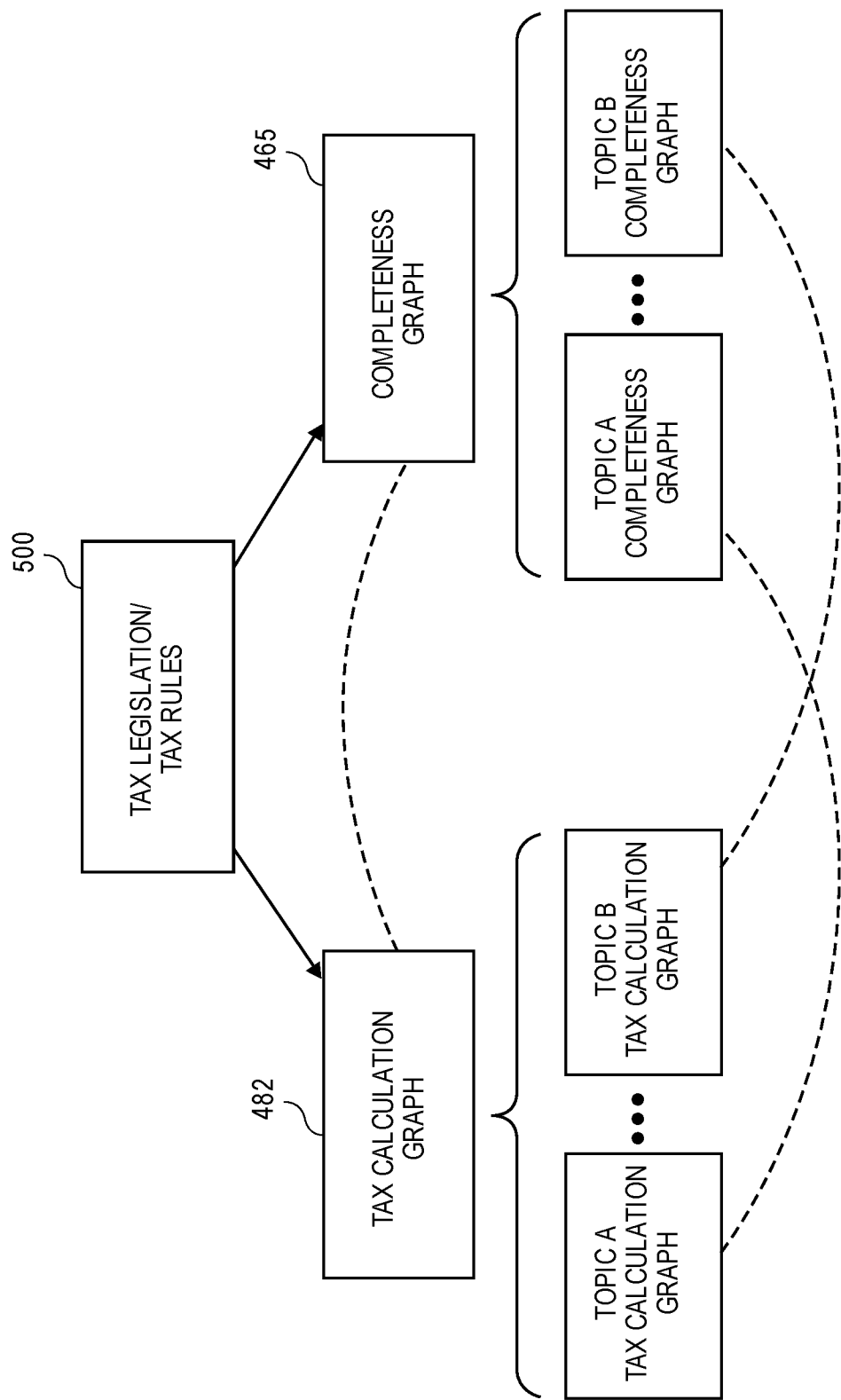
FIG. 5 illustrates how tax legislation/tax rules are parsed and represented by a completeness graph and a tax calculation graph according to embodiments.

As shown in FIG. 5, a completeness graph 465 and a tax calculation graph 482 are interdependent as illustrated by dashed lines. In other words, some elements contained within the completeness graph 465 are needed to perform actual tax calculations using the tax calculation graph 482. Likewise, aspects within the tax calculation graph 482 may be needed as part of the completion graph 465. Thus, for example, depending on how a system and linking between a completeness graph 465 and tax calculation graph 482 are configured, a completion graph 465 may reference or be associated with a particular schema 446 element and associated instance data 442 in the data store 440, and the completion graph 465 may include a pointer or reference to that section of the calculation graph 465, and/or the calculation graph 465 may include a pointer or reference to a section of the completion graph 465. Taken collectively, the completeness graph 465 and the tax calculation graph 482 represent declarative data structures or a declarative knowledge base that capture all the conditions necessary to complete the computations that are required to complete a tax return that can be filed. The completeness graph 465, for example, determines when all conditions have been satisfied such that a "fileable" tax return can be prepared with the current runtime data 442. The completeness graph 465 is used to determine, for example, that no additional data input is needed to prepare and ultimately file a tax return, and the tax return can be prepared and filed. Individual combinations of completeness graphs 465 and tax calculation graphs 482 that relate to one or more topics can be used to complete the computations required for some sub-calculation. In the context of a tax setting, for example, a sub-selection of topical completeness graphs 465 and tax calculation graphs 482 can be used for intermediate tax results such as Adjusted Gross Income (AGI) or Taxable Income (TI).

Figure 6:
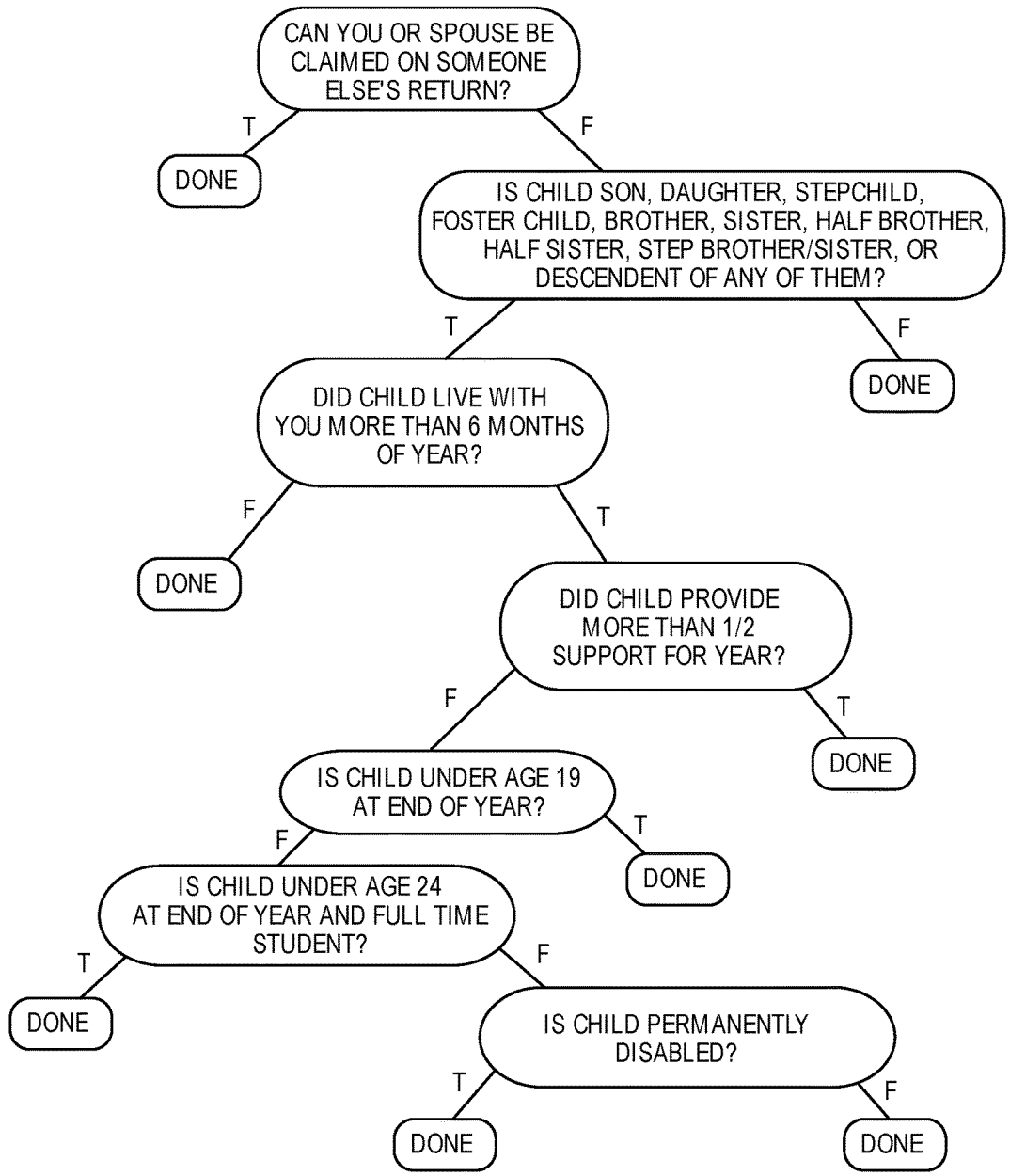
FIG. 6 illustrates an example of a simplified version of data that is utilized for generation of a completeness graph related to a qualifying child for purposes of determining deductions for federal income tax purposes.
Figure 7:
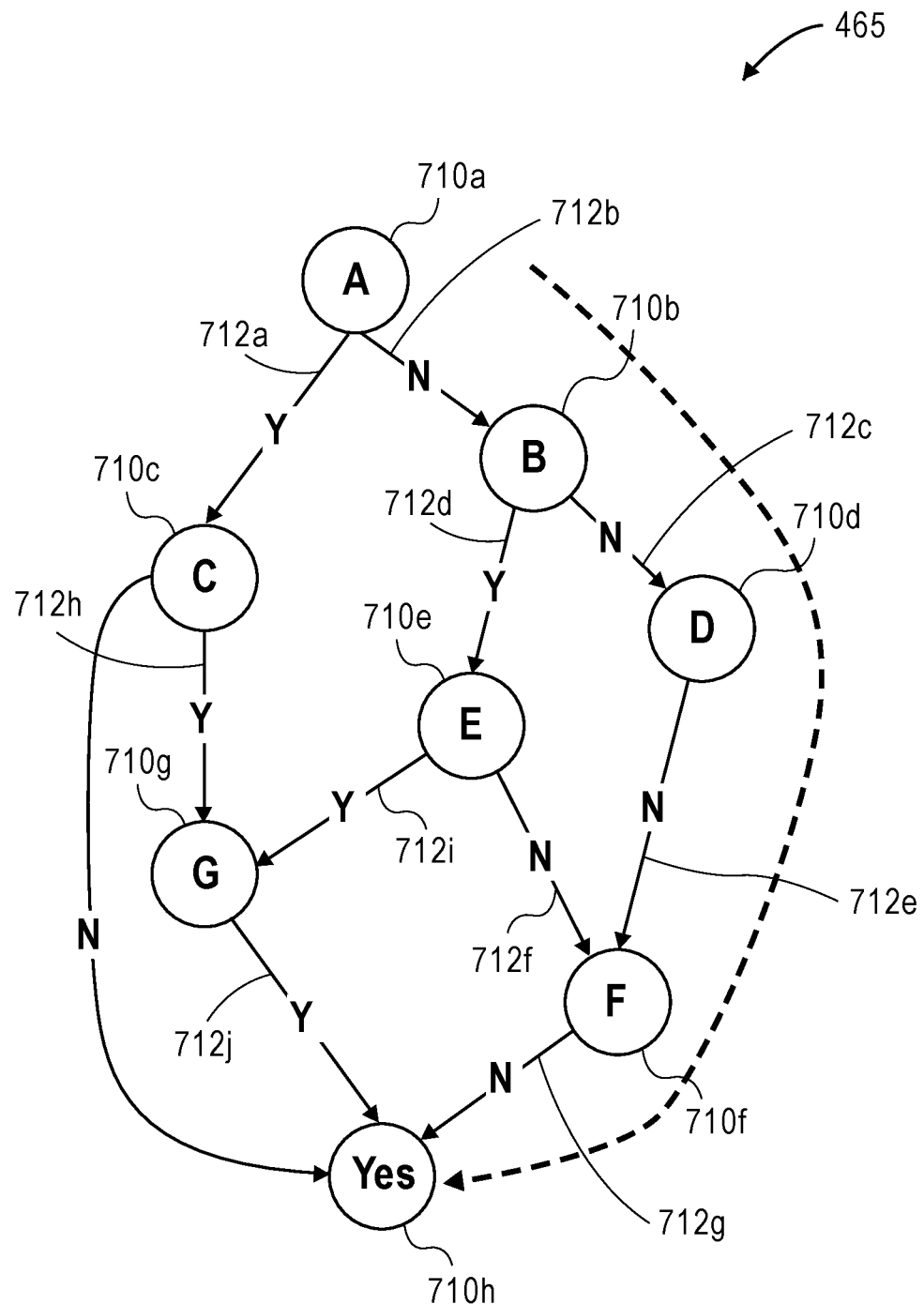
FIG. 7 generally illustrates a completeness graph in the form of a directed graph.

The completeness graph 465 and the tax calculation graph 482 represent data structures that can be constructed in the form of tree. FIG. 7 generally illustrates a completeness or directed graph 465 in the form of a tree structure including nodes 710a-g, in which node 710a is a beginning or start node, a "Yes" or termination node 710 indicating completion, and arcs 712 a-j representing different possible answers and the relationship between different nodes 710 or questions depend on the a basic or general version of a completeness graph 465 for the particular topic, such as determining whether a child qualifies as a dependent for federal income tax purposes. A more complete flow chart-based representation of questions related to determining a "qualified child" is illustrated in FIG. 6. Each node 710 contains a condition that in this example is expressed as a Boolean expression that, in the illustrated embodiment, can be answered in the affirmative or negative. The arcs 712 that connect each node 710 illustrate the answers and dependencies between nodes 710, and the combination of arcs 712 in the completeness graph 465 illustrates the various pathways to completion. A single arc 712 or combination of arcs 712 that result in a determination of "Done" represent a pathway to completion. As generally shown in FIG. 7, there are several pathways to completion.

More specifically, FIG. 7 generally illustrates a completeness graph 465 that includes a beginning node (Node A) 710a, intermediate nodes (Nodes B-G) 710b-g and a termination node (Node "Yes" or "Done") 710h. Each of the beginning node 710a, and intermediate nodes 710b-g represents a question. Inter-node connections or arcs 712 represent response options. In the illustrated embodiment, each inter-node connection 712 represents an answer or response option in binary form (Y/N), for instance, a response to a Boolean expression. It will be understood, however, that embodiments are not so limited, and that a binary response form is provided as a non-limiting example. In the illustrated example, certain nodes, such as nodes A, B and E, have two response options, whereas other nodes, such as nodes D, G and F, have one response option.

As a specific example, referring again to FIG. 6, one pathway to completion is where an affirmative (True) answer is given to the question of whether you or a spouse can be claimed on someone else's tax return. If such a condition is true, your child is not a qualifying dependent because under IRS rules you cannot claim any dependents if someone else can claim you as a dependent. In another example, if you had a child and that child did not live with you for more than 6 months of the year, then your child is not a qualifying dependent. Again, this is a separate IRS requirement for a qualified dependent.

As will be understood, given the complexities and nuances of the tax code, many tax topics may contain completeness graphs 465 that have many nodes 710 with a large number of pathways to completion. However, by many branches or lines within the completeness graph 465 can be ignored, for example, when certain questions internal to the completeness graph 465 are answered that eliminate other pathways, or other nodes 710 and arcs 712, within the completeness graph 465. The dependent logic expressed by the completeness graph 465 utilized according to embodiments allows one to minimize subsequent questions based on answers given to prior questions, which allows for generation of a reduced or minimized question set that is presented to a user as explained herein, thus providing for more efficient, meaningful and user friendly tax return preparation experience.

Figure 8:
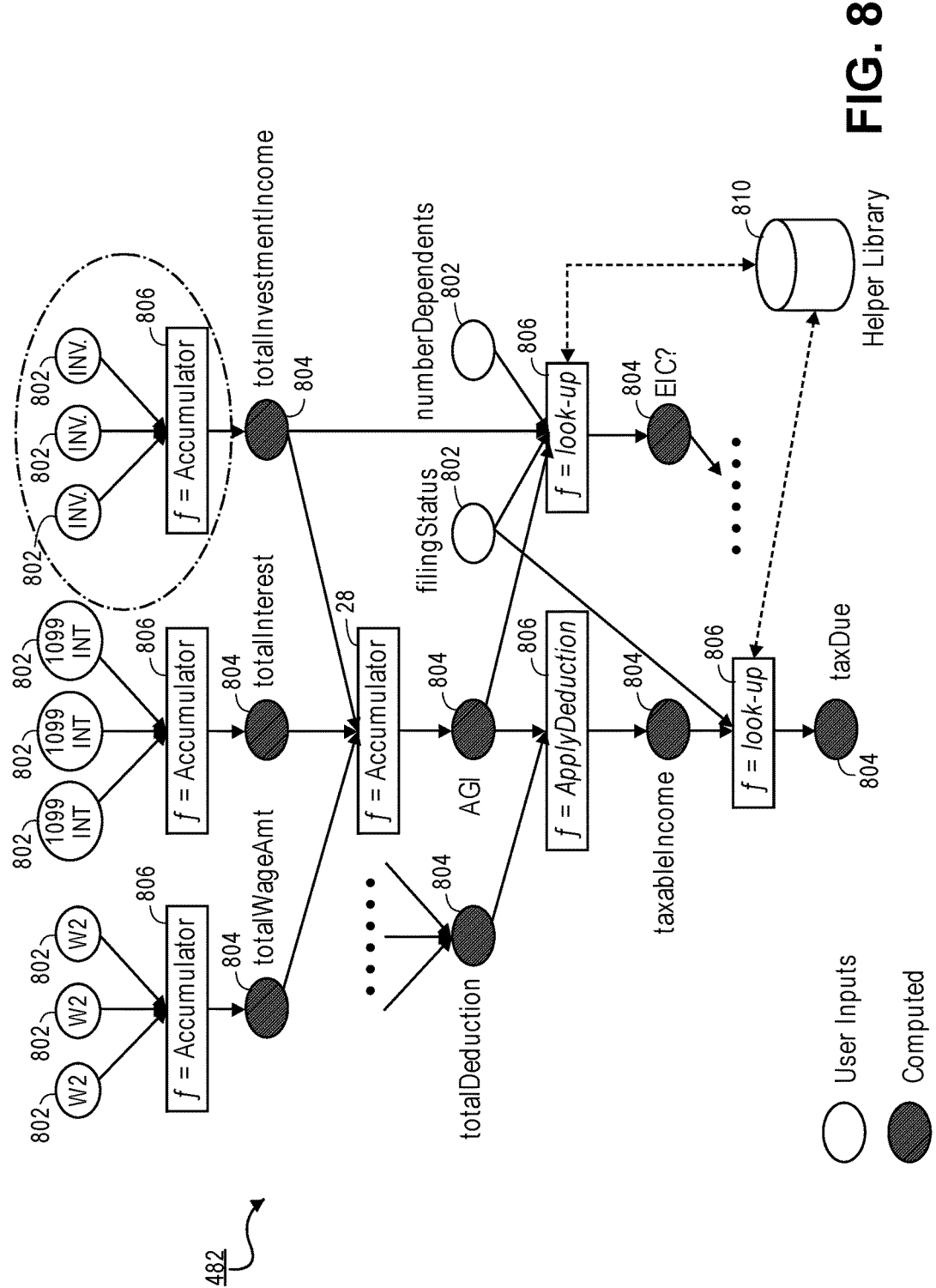
FIG. 8 illustrates an example of a calculation graph.

FIG. 8 illustrates one example of a tax calculation graph 482. The tax calculation graph 482 semantically describes data dependent tax operations that used perform a tax calculation in accordance with the tax code or tax rules. Tax calculation graph 482 in FIG. 8 is a simplified view of data dependent tax operations that are used to determine the taxes Due (taxDue) based on various sources of income, deductions, exemptions, and credits. Tax calculation graph 482 is a type of directed graph and, in most situations relevant to tax calculations, is a directed acyclic graph that encodes the data dependencies amongst tax concepts or topics.

In FIG. 8, various nodes 802 are leaf or input nodes. Examples of leaf nodes 802 in this particular example include data obtained from W-2 forms, data obtained from 1099-INT forms, data obtained from other investment income (INV), filing status, and number of dependents. Typically, though not exclusively, leaf nodes 802 are populated with user inputs. That is to say the user taxpayer will enter this information from a user interface as described herein. In other embodiments, however, the leaf nodes 802 may be populated with information that is automatically obtained by the tax preparation software. For example, in some embodiments, tax documents may be imaged or scanned with relevant data being automatically extracted using Object Character Recognition (OCR) techniques. In other embodiments, prior tax returns may be used by the tax preparation software to extract information (e.g., name, potential dependents, address, and social security number) which can then be used to populate the leaf nodes 802. Online resources such as financial services websites or other user-specific websites can be crawled and scanned to scrape or otherwise download tax related information that can be automatically populated into leaf nodes 802. Additional third party information sources such as credit bureaus, government databases, and the like can also be used by the tax preparation software to obtain information that can then be populated in to respective leaf nodes 802.

In still other embodiments, values for leaf nodes 802 may be derived or otherwise calculated. For example, while the number of dependents may be manually entered by a taxpayer, those dependent may not all be "qualifying" dependents for tax purposes. In such instances, the actual number of "qualified" dependents may be derived or calculated by the tax preparation software. In still other embodiments, values for leaf nodes 802 may be estimated.

Still other internal nodes referred to as functional nodes 804 semantically represent a tax concept and may be calculated or otherwise determined using a function 806. Functional node 804 and the associated function 806 define a particular tax operation. For example, as seen in FIG. 8, operation refers to total wage income and is the result of the accumulator function 806 summing all W-2 income from leaf nodes 802. Functional node 804 may include a number in some instances. In other instances, the functional node 804 may include a response to a Boolean expression such as "true" or "false." The functional nodes 804 may also be constant values in some instances. Some or all of these functional nodes 804 may be labelled as "tax concepts" or "tax topics." The combination of a functional node 804 and its associated function 806 relate to a specific tax operation as part of the tax topic.

Interconnected function nodes 804 containing data dependent tax concepts or topics are associated with a discrete set of functions 806 that are used to capture domain specific patterns and semantic abstractions used in the tax calculation. The discrete set of functions 806 that are associated with any particular function node 804 are commonly reoccurring operations for functions that are used throughout the process of calculating tax liability. For example, examples of such commonly reoccurring functions 806 include copy, capping, thresholding (e.g., above or below a fixed amount), accumulation or adding, look-up operations (e.g., look-up tax tables), percentage of calculation, phase out calculations, comparison calculations, exemptions, exclusions, and the like.

In one embodiment, the entire set of functions 806 that is used to compute or calculate a tax liability is stored within a data store 810 which in some instances may be a database. The various functions 806 that are used to semantically describe data connections between function nodes 804 can be called upon by the tax preparation software for performing tax calculations. Utilizing these common functions 806 greatly improves the efficiency of the tax preparation software can be used by programmer to more easily track and follow the complex nature of the ever-evolving tax code. The common functions 806 also enables easier updating of the tax preparation software because as tax laws and regulations change, fewer changes need to be made to the software code as compared to prior hard-wired approaches.

Tax calculation graph 482 and the associated function nodes 804 and functions 806 can be tagged and later be used or called upon to intelligently explain to the user the reasoning behind why a particular result was calculated or determined by the tax preparation software program as explained in more detail below. The functions 806 can be de-coupled from a specific narrow definition and instead be associated with one or more explanations. Examples of common functions 806 found in tax legislation and tax rules include the concepts of "caps" or "exemptions" that are found in various portions of the tax code. One example of a "cap" is the portion of the U.S. tax code that limits the ability of a joint filer to deduct more than $3,000 of net capital losses in any single tax year. There are many other instances of such caps. An example of an "exemption" is one that relates to early distributions from retirement plants. For most retirement plans, early distributions from qualified retirement plans prior to reaching the age of fifty nine and one-half (59½) require a 10% penalty. This penalty can be avoided, however, if an exemption applies such as the total and permanent disability of the participant. Other exemptions also apply. Such exemptions are found throughout various aspects of the tax code and tax regulations.

Function 806 may also include any number of mathematical or other operations. Examples of functions 806 include summation, subtraction, multiplication, division, and comparisons, greater of, lesser of, at least one of, calling of look-ups of tables or values from a database 810 or library as is illustrated in FIG. 8. It should be understood that the function nodes 804 in the tax calculation graph 482 may be shared in some instances. For example, AGI is a reoccurring tax concept that occurs in many places in the tax code. AGI is used not only for the mathematical computation of taxes is also used, for example, to determine eligibility of certain tax deductions and credits. The AGI function node 804 may be found in multiple locations within the tax calculation graph 485. Taxable income is another example of such a function node 804.

Figure 9A:
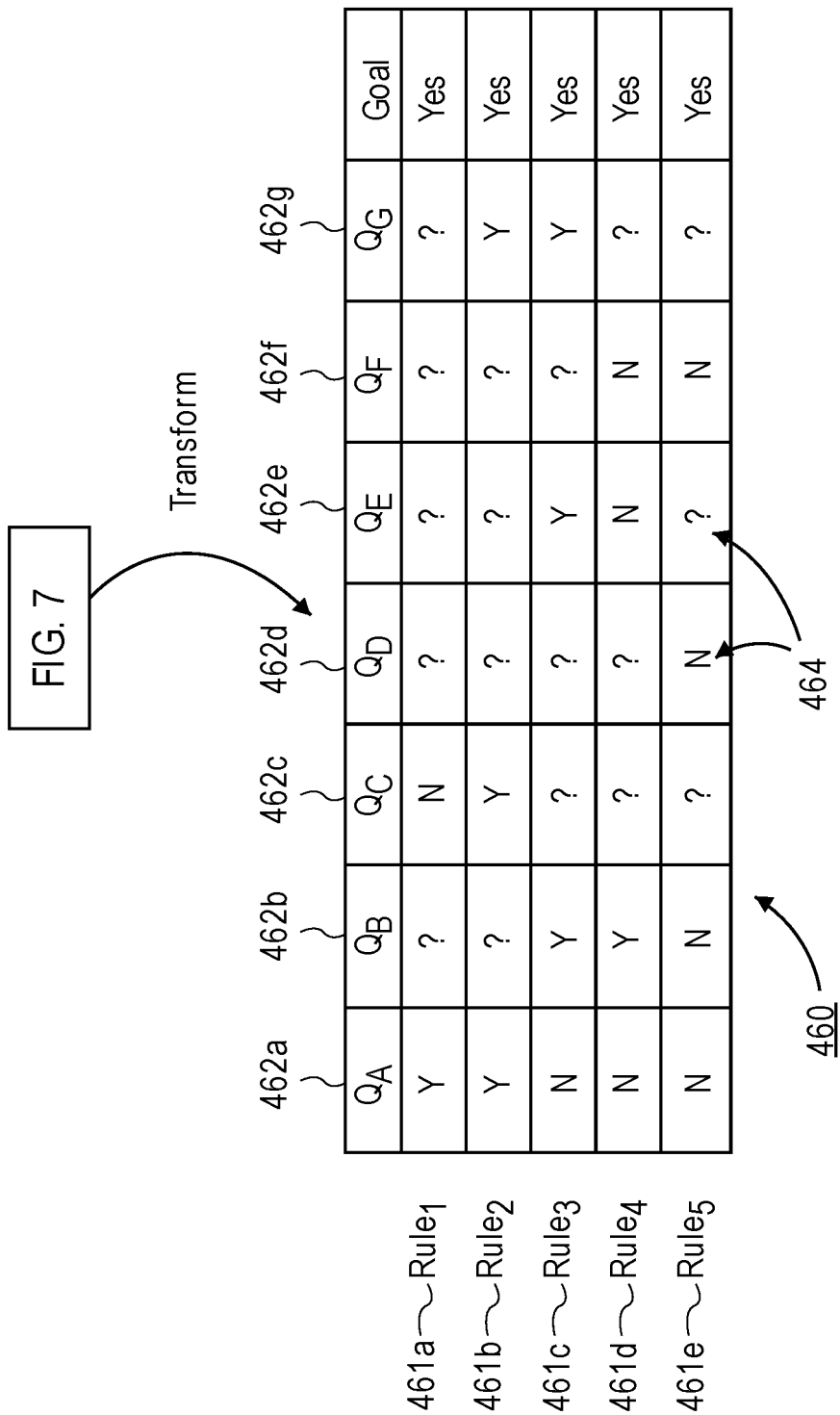
FIG. 9A illustrates a decision table based on or derived from a completeness graph of FIG. 7.

Referring to FIG. 9A, the decision table 460 shown in FIG. 9A reflects the question-and-answer flow of the completeness or directed graph 465 and the result of multiple data structure transformations. In the illustrated example, rows of the decision table 460 define rules 461 (e.g., Rules R1-R5 as shown in FIG. 9A), and columns of the decision table 460 indicate questions 462 (Q1-Q5 shown in FIG. 4, or Questions A-G shown in FIG. 9) and fields of the decision table 460 represent how the runtime data 442 applies to a question 462, i.e., answers 464 are provided by the runtime data 442 for different questions 462 (if such answers are included in the runtime data 442). During processing, the decision table 460 is scanned by the tax logic agent 410 to determine which answers 464 or run against the runtime data 442. The tax logic agent 410 determines how much the runtime data 442 completes the decision table 460 and determines or selects candidate questions 462 to be presented to the user.

Figure 9B:
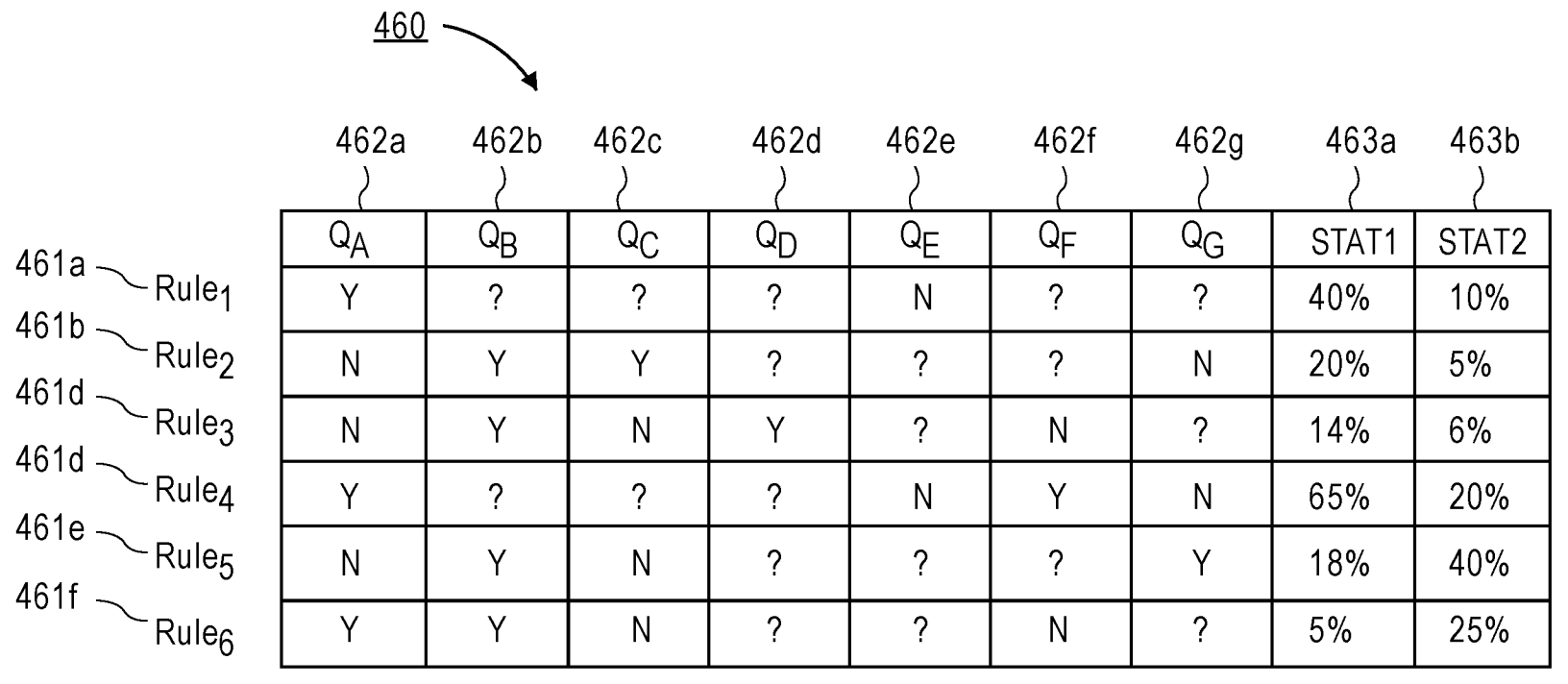

In one embodiment, as shown in FIG. 9B, statistical data 463 (which may be appended as columns to the rule-question decision table 460 shown in FIG. 9A, may be received from or based on data collected by statistical/life knowledge module 490 described in further detail below) indicates how likely a question or topic 462 is to be relevant to a user given a set of runtime data 442 and may be utilized by the rule engine 442 when determining which candidate question or topic 462c to select.

For example, the decision table 460 may include columns that contain statistical data 463 in the form of percentages. A column (STAT1 shown in FIG. 9B) may contain a percentage value that indicates taxpayers under the age of thirty-five where $Rule_1$ is satisfied. Another column (STAT2 shown in FIG. 9B) may contain a percentage value that indicates taxpayers over the age of thirty-five where $Rule_1$ is satisfied. Any number of additional columns could be added to the decision table 460 and the statistics 463 do not have to relate to an age threshold or grouping. The statistical data 463 may be used, as explained in more detail below, by the tax return preparation application to determine which of the candidate questions ($Q_A$-$Q_G$) 462c should be selected by the tax logic agent 410 for presentation to or asked of the user. The statistical data 463 may be compared to one or more known taxpayer data fields (e.g., age, income level, tax filing status, geographic location, or the like) such that the question that is presented to the user is most likely to lead to a path to completion. Candidate questions 462c may also be excluded or grouped together and then presented to the user to efficiently minimize tax interview questions during the data acquisition process. For example, questions that are likely to be answered in the negative can be grouped together and presented to the user in a grouping and asked in the negative—for example, "we think these question do not apply to you, please confirm that this is correct." This enables the elimination of many pathways to completion that can optimize additional data requests of the taxpayer.

The tax logic agent 410 may also receive or otherwise incorporate information from a statistical/life knowledge module 490. The statistical/life knowledge module 490 contains statistical or probabilistic data related to the current or other users of the tax return preparation application and/or other taxpayers. For example, statistical/life knowledge module 490 may indicate that taxpayers residing within a particular zip code are more likely to be homeowners than renters. The tax logic agent 410 may use this knowledge to weight particular topics or questions related to these topics when processing rules 461 and questions 462 and generating non-binding suggestions 411. Suggestions 411 generated by the tax logic agent 410 may be, for example, a question, declarative statement, identification of a topic and may include a ranked listing of suggestions 411. The ranking 418 may be weighted in order of importance, relevancy, confidence level, or the like. Statistical data 463/490 may be incorporated by the tax logic agent 410 to be used as part of the candidate question ranking 418 which, in turn, may be used by the tax logic agent 410 to assign a ranking to the non-binding suggestions 411 generated by the tax logic agent 410.

For example, questions 461 about home mortgage interest may be promoted or otherwise given a higher weight for users in particular zip codes or income levels. The statistical knowledge 490 may apply in other ways as well. For example, tax forms often require a user to list his or her profession. These professions may be associated with transactions that may affect tax liability. For instance, a taxpayer may list his or her occupation as "teacher." The statistic/life knowledge module 490 may contain data that shows that a large percentage of teachers have retirement accounts, and in particular, 403(b) retirement accounts. This information may then be used by the tax logic agent 410 when generating its suggestions 411. For example, rather than asking generically about retirement accounts, the suggestion 411 can be tailored directly to a question about 403(b) retirement accounts.

Data contained within the statistic/life knowledge module 490 may be obtained by analyzing aggregate tax data of a large body of taxpayers. For example, entities having access to tax filings may be able to mine their own proprietary data to establish connections and links between various taxpayer characteristics and tax topics. This information may be contained in a database or other repository that is accessed by the statistic/life knowledge module 490. This information may be periodically refreshed or updated to reflect the most up-to-date relationships. Generally, the data contained in the statistic/life knowledge module 490 is not specific to a particular tax payer but is rather generalized to characteristics shared across a number of tax payers although in other embodiments, the data may be more specific to an individual taxpayer.

In one embodiment, the rule engine 412 reads the runtime data 442 and uses that data 442 as answers or inputs to the decision table 460 to eliminate rules 461 that may apply which, is used to eliminate candidate questions 462e ("e" referring to eliminated) from consideration rather than requiring the user to step through each question of a predetermined sequence of questions in order to conclude that a particular tax situation or topic applies to the user.

For example, referring to FIG. 10, and continuing with the example of the decision table 465 shown in FIG. 9, runtime data 442 resulting from data or answers 436 provided by the user or imported from an electronic file is used to determine which rows or rules 461 to cross out in the decision table 460. In the illustrated example, if it is known from the runtime data 442 that the answer to Question A is "Y" then rules 461 R3-R5 involving a "N" answer to Question A are not applicable, and those rows or rules 461 of the decision table 460 including a "N" answer to Question A (i.e., the bottom three rows in the illustrated example) can be crossed out 1010 or eliminated from consideration. This leaves two rows or rules 461 R1 and R2 in the illustrated example. Since questions B, D and E are "don't care" or "not relevant" (indicated by "?") and the answer to Question A is already known ("Y"), then the remaining candidate questions 461c that require answers based on the current runtime data 442 include Questions C and G. Thus, the rule engine 412 uses the decision table 460 to select one or more rules 461 and determine or select one or more candidate questions 462c that are unanswered in view of the current runtime or instance data 442 and that should be presented or asked of the user to proceed to completion.

The results of the decision table 460 processing, whether for tax compliance or tax authority requirements, rules for errors, inconsistency or relevancy, or rules for question selection or identification, may identified candidate questions or topics that can be presented to the user and serve as a basis for one or more non-binding suggestions 411 that is to be provided to the interface controller 430. It will be understood that various types and numbers of rules 461 may be utilized for different purposes, and certain rules 461 may expressed using concepts or terms of the canonical schema 446, which together form a canonical tax knowledge base, and the runtime data 442 is an instantiated representation of the canonical schema 446 at runtime.

According to one embodiment, the rule engine 412 or production rule system ("rule engine" as generally illustrated in FIG. 4) is a declarative, inference based or reasoning based rule engine. For example, embodiments may utilize a rule engine 412 in the form of a drools expert engine. Other rule engines 412 that process declarative representations of data may also be utilized, and a drools expert rule engine is provided as one example of how embodiments may be implemented.

The following pseudocode generally expresses how the tax logic agent 410 functions utilizing a fact cache based on the runtime data 442 or the instantiated representation of the canonical 446 at runtime and generating non-binding suggestions 411 provided as an input to the interface controller 430. Data such as required inputs can be stored to a fact cache so that the needed inputs can be recalled at a later time, and to determine what is already known about variables, factors or requirements of various rules 461.

```
Rule module / Tax Logic Agent (TLA) (410)
    // initialization process
    Load_Tax_Knowledge_Base;
    Create_Fact_Cache; While (new_data_from_application)
        Insert_data_into_fact_cache;
            collection = Execute_Tax_Rules; // collection is all the fired
    rules and corresponding conditions
            suggestions = Generate_suggestions (collection);
            send_to_application(suggestions);
End
```

The tax logic agent 410 provides to the interface controller 430 a non-binding suggestion 411 comprising a selected question or topic 461 to be addressed. In the illustrated embodiment, the interface controller 430 includes a UI or user experience manager 431 that determines how to process the non-binding suggestions 411 with the selected questions or topics and generates an interview screen 432 for the UI or selects an interview screen 432 of the UI based on the question or topic of the non-binding suggestion 411. For ease of explanation, reference is made generally to an interface controller 430.

The interface controller 430 may include a suggestion resolution element is responsible for resolving the strategy of how to respond to incoming non-binding suggestions 411 received from the tax logic agent 410, and for this purpose, the suggestion resolution element may be programmed or configured or controlled by configuration files 433 that specify whether, when and/or how non-binding suggestions 411 are processed. Configuration files 433 may, for example, specify conditions or criteria such as priority, sequence, timing, in a current, next or subsequent interview screen, random, never or ignore, not until additional data received or other tax forms are completed.

For example, a configuration file 433 may specify one or more or all of how to process the non-binding suggestion 411 based on whether to consider or ignore the non-binding suggestion 411, when the non-binding suggestion 411 should be processed, content of an interview screen 432 based on the non-binding suggestion 411, how to present content or interview screens 432 based on the non-binding suggestion 411 in view of a form factor or type of a computing device utilized by the user of the tax preparation application or that executes the tax return preparation application embodying system components described above, which non-binding suggestion(s) 411 have priority over others or a sequence of non-binding suggestions 411, which configuration files 433 have priority over others or a sequence of configuration files 433 in the event that multiple configuration files 433 may potentially be used for purposes of configuration conflict resolution. For example, a configuration file 433 may specify that a non-binding suggestion 411 should be processed or addressed immediately or on the spot, next, at a later time, after certain or other additional tax return data has been received, or at the end of the process. Configuration files 433 may also specify whether non-binding suggestions 411 should be processed individually or aggregated for processing as a group with resolution of any priority issues. As another example, a configuration file 433 may specify that content should be adjusted or whether or how non-binding suggestions 411 should be processed in view of a screen size or dimension of a type of computing device that executes the tax preparation application since questions or more content may be more suitable for computing devices such as laptop and desktop computers, which have larger screens than smaller mobile communication devices such as smartphones.

Configuration files 433 may also be used to specify how notifications received from the completeness status monitor 420 are processed, or how to address instances in which the interface controller 430 has received a non-binding suggestion 411 from the tax logic agent 410 and a notification 420 concerning a tax topic that was complete but is no longer complete from the completion monitor 420. For example, a configuration file 433 may specify that when a notification is outstanding, the notification takes priority, or if there are multiple notifications, then the notification concerning the tax topic visited more recently is prioritized, or that the notification involving a tax topics that can be addressed more quickly (fewer questions) can be prioritized. As another example, if the interface controller 430 has received a notification 421 and a non-binding suggestion 411, then a non-binding suggestion 411 that involves the same topic as the topic identified in the notification 421 would be prioritized over other non-binding suggestion 411.

The interface controller 430, e.g., based on execution of a configuration file 433, generates the resulting user interaction or experience or creates or prepares an interview screen 432 or content thereof based on a library of visual assets such as pre-programmed interview screens or interview screens that are templates and that can be populated by the interface controller 430 with a question 461 or topic of a non-binding suggestion 411.

The interface manager 431 generates the resulting user interaction or experience or creates or prepares an interview screen 123 or content thereof based on a non-binding suggestion 411 and/or notification 421 and for these purposes, may utilize a library of visual assets. Visual assets may be pre-programmed interview screens 123 that can be selected by the interface manager 431 for interview screen 123 or content thereof, or for a sequence of interview screens 123. Visual assets may also include interview screen templates, which are blank or partially completed interview screens that can be utilized by the generation element to construct an interview screen 123 on the fly during runtime in the event that an appropriate pre-programmed or pre-determined interview screen or other visual asset is not available or cannot be identified by the interview screen management element. The following exemplary pseudocode describes how an interface manager 431 may be structured and operate"

---

Suggestion Resolution Element
// Take a suggestion and consult the behavior configuration to
// decide which ones the Ul will handle
Suggestions = Get_suggestions_from_TLA [Tax Logic Agent];
New_list = Rank_and_Filter(Suggestions, Configuration_File);
Generation Element
For each item in New_list
Ul_asset = Flow_View_Manager(item);
If Ul_asset == NULL   // if Flow_View_Manager does not have any ready to go asset for the item
    Template = Get_Template(item) // identify a template based on the item e.g. its type
    Ul_asset = Construct_Ul_Asset(Template, item)
        End
    End
Interview Screen Management Element
Provide look-up capability to return Ul asset (flow/view) if there is any, for given model field

---

With continuing reference to FIGS. 4 and 8, the tax calculation engine 480 reads the current runtime data 442 from the shared data store 440, and uses this data as inputs into respective nodes of one or more calculation graphs 482, and respective results or values are calculated with associated functions that are executed with the input data. New or resulting data is written back by the tax calculation engine 480 to the shared data store 440 for subsequent reading by the tax logic agent 410. For example, if the runtime data 442 received thus far includes wages and interest earned from two savings accounts, a function for calculating Adjusted Gross Income (AGI) would sum this wage and interest data, and the resulting AGI value (based on the runtime data received thus far) is written back to the shared data store. As other types of AGI data are received or imported, the tax calculation engine 480 will run the calculation graphs 482 again to calculate a new AGI value, which would then be stored to the data store 482.

Thus, in contrast to the rigidly defined user interface screens used in prior iterations of tax preparation software, embodiments of the current invention provide a tax return preparation system that runs on computing devices that operates on a new construct in which tax rules and the calculations based thereon are established in declarative data-structures, namely, completeness graph(s) 465 and tax calculation graph(s) 482. Use of these data structures permits the interface controller 430 to be loosely coupled or connected to, or even divorced from, the tax calculation engine 482 and the data used in the tax calculations. Tax calculations are dynamically calculated based in tax data derived from sourced data, estimates, or user input. A smart tax logic agent 410 running based on the decision table 460 and derived rules 461 and questions 462 thereof can review current run time data 442 and evaluate missing data fields and propose suggested questions 411 to be asked to a user to fill in missing blanks. This iterative process can be continued until completeness of all tax topics as reflected in decision tables 460 has occurred. An electronic return can then be prepared and filed with respect to the relevant taxing jurisdictions.

Figure 11:
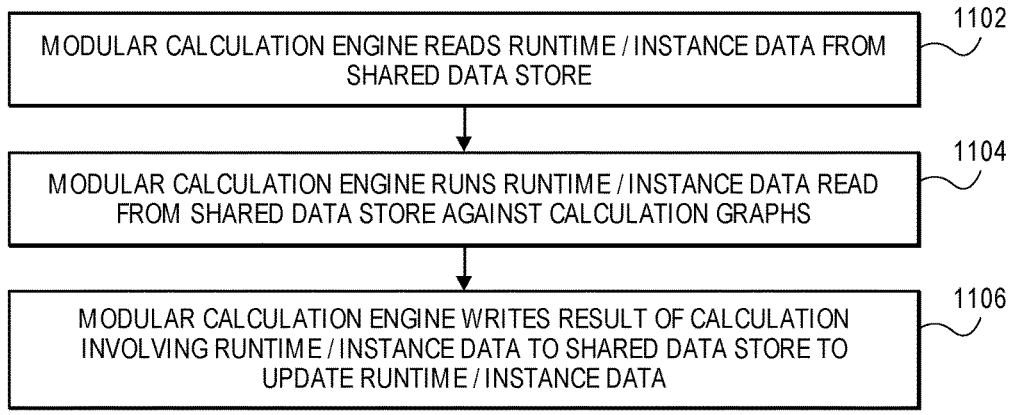
FIG. 11 is a flow diagram illustrating a computer-implemented algorithm for generating calculation results based on data of a shared data store.

With continuing reference to FIG. 4 and with reference to FIG. 11, and utilizing a system configuration in which the completion monitor 420 is in communication with the interface controller 430 but not the tax logic agent 410 (i.e., the completion monitor 420 does not intercept non-binding suggestions 411 generated by the tax logic agent 410), the system 400 is configured or programmed to execute a computer-implemented method for generating a user interface including one or more interview screens 432 and identifying and processing completion status modifications due to runtime data 442 updates, and the process is described from an exemplary runtime data 442 starting point of an update to the runtime data 442 generated by the calculation engine 480.

At 1102, as an exemplary starting point of runtime data 442 as updated by the calculation engine 480, the calculation engine 480 reads runtime or instance data 442 from the shared data store 440, and at 1104, runs that data against calculation graphs 482. At 1106, if necessary, the calculation engine 480 writes a result of a calculation that was executed with the calculation graph 482 to the shared data store 440 to update the runtime or instance data 442 by incorporating the determined calculation result.

Figure 12:
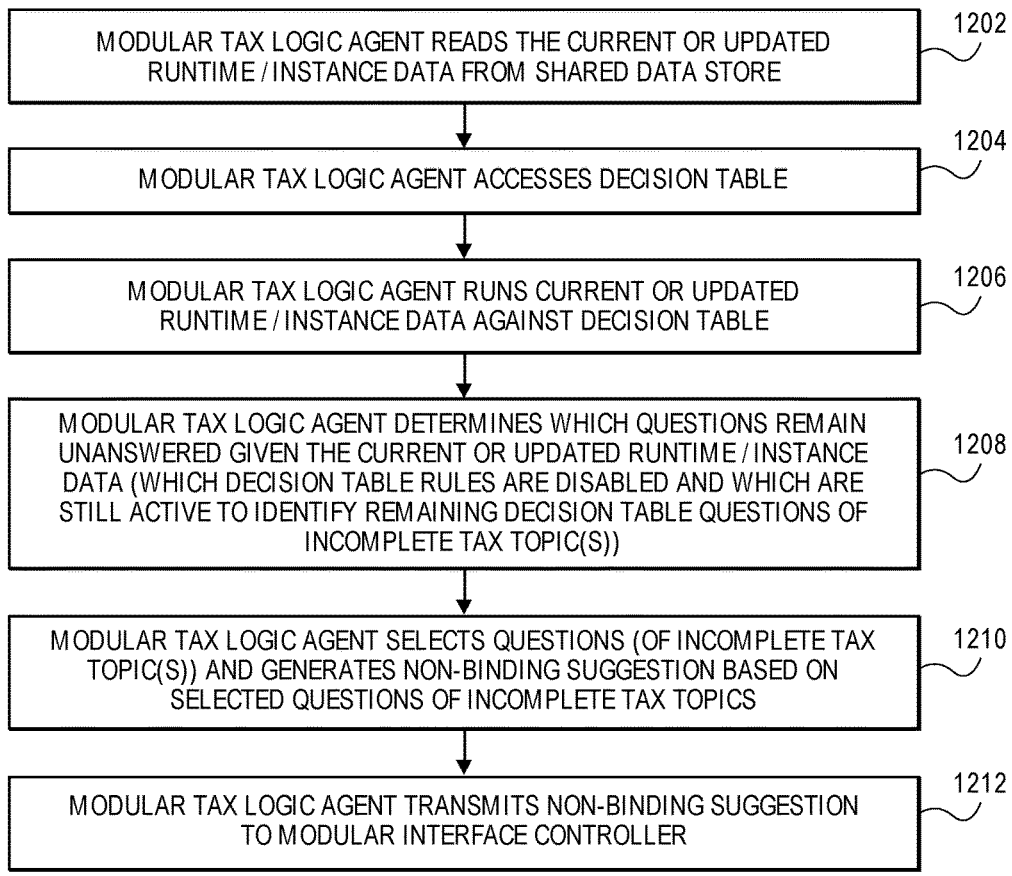
FIG. 12 is a flow diagram illustrating a computer-implemented algorithm involving a tax logic agent generating and communicating an non-binding suggestion.

Referring to FIG. 12, at 1202, the tax logic agent 410 reads the current or updated runtime or instance data 442 from the shared data store 440, and at 1204, accesses the decision table(s) 460, and runs the current or updated runtime or instance data 442 against the decision tables 460 at 1206. At 1208, the tax logic agent 410 determines which questions 462 remain unanswered given the current or updated runtime/instance data 442 (which decision table rules 461 are disabled and which are still active to identify remaining decision table questions 462 of incomplete tax topic(s)), and at 1210, selects questions 462 (of incomplete tax topic(s)) and generates non-binding suggestion 411 based on selected questions 462/incomplete tax topics. At 1212, the tax logic agent 410 transmits the non-binding suggestion 411 to the interface controller 430.

Figure 13:
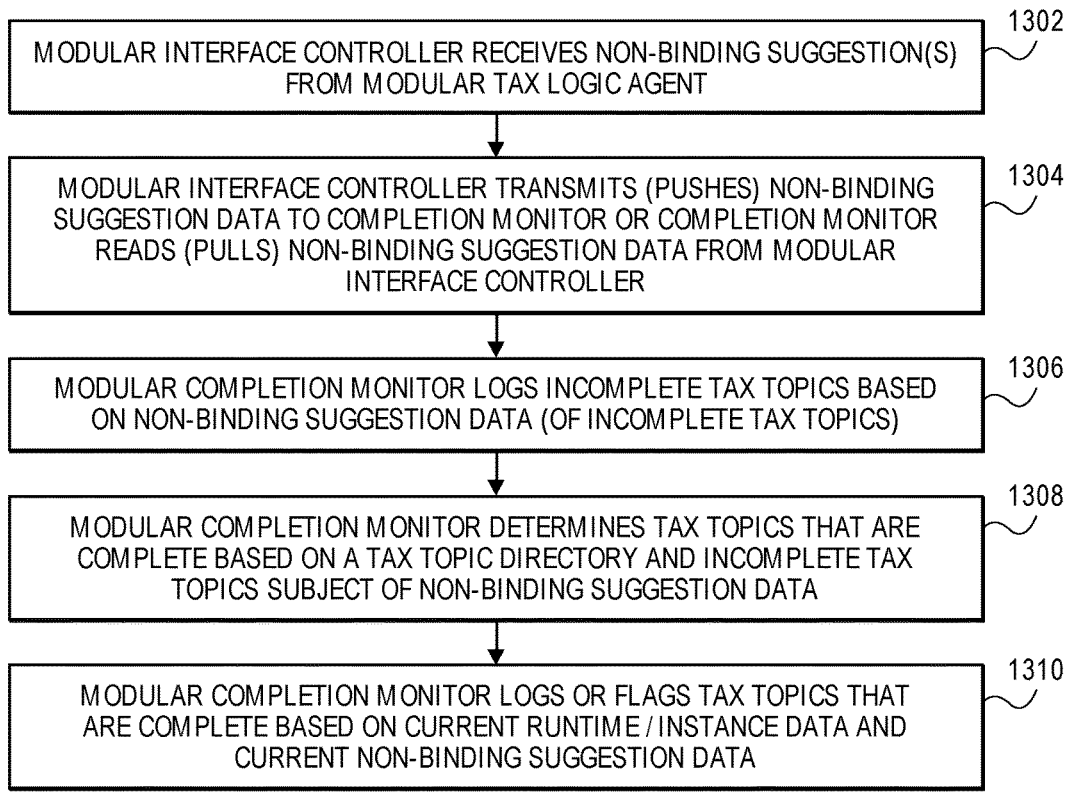
FIG. 13 is a flow diagram illustrating a computer-implemented algorithm involving an interface controller communicating non-binding suggestion data to a completion monitor and processing by the completion monitor.

Continuing with reference to FIG. 4 and FIG. 13, the interface controller 430 receives non-binding suggestion(s) 411 from the tax logic agent 410 at 1302, and at 1304, transmits or pushes non-binding suggestion 411 data to completion monitor 420, e.g., in response to receiving the non-binding suggestion 411. In another embodiment, the completion monitor 420 reads or pulls non-binding suggestion 411 data from the interface controller 430, e.g., periodically. At 1306, the completion monitor 420 reads the non-binding suggestion 411 data to determine the incomplete tax topics that are the subject of the non-binding suggestion 411, and records incomplete tax topics 424 to a completeness log 422. At 1308, the completion monitor 420 determines tax topics that are complete 423 based at least in part upon the non-binding suggestion 411 data. For example, knowing which tax topics are incomplete 424 for a given iteration of runtime data 442 based on the non-binding suggestion 411 data, the completion monitor 420, having determined the incomplete tax topics 424, can access a tax topic directory or library 426 to determine which tax topics are complete 423, and this is also recorded to the completeness log 422 for the associated current iteration of runtime or instance data 442. Thus, the log 422 can be used to record complete tax topics 423 and incomplete tax topics 424 for each runtime data 442 iteration or update. At 1310, the completion monitor 420 marks or flags the logged tax topics that are complete 423.

Figure 14:
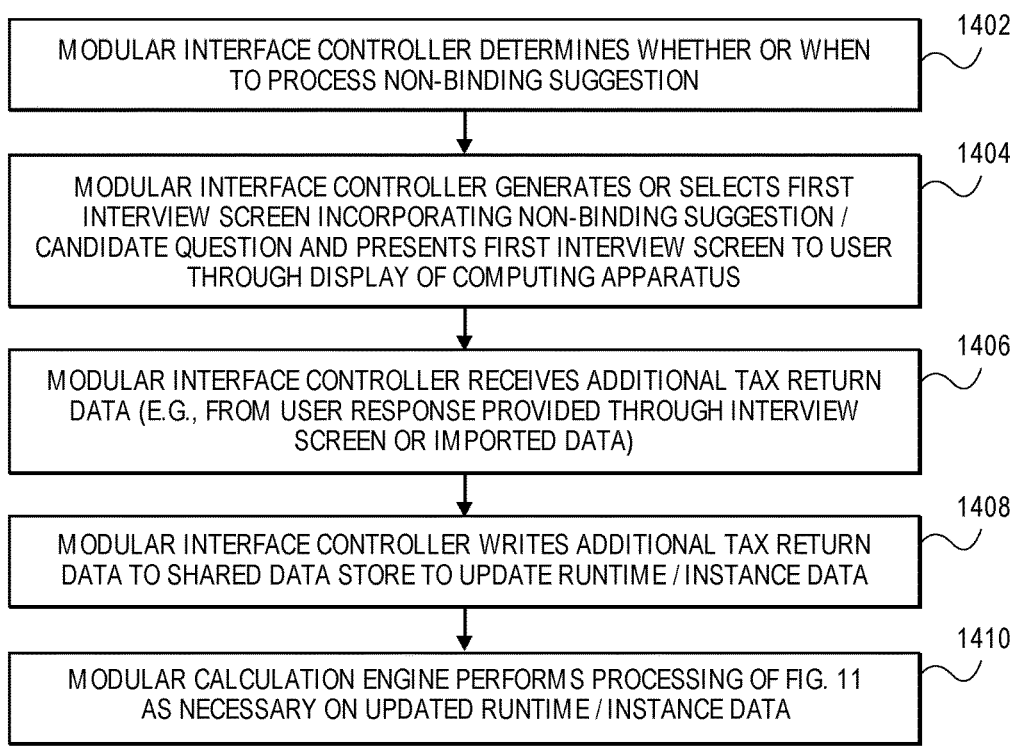
FIG. 14 is a flow diagram illustrating a computer-implemented algorithm involving an interface controller processing a non-binding suggestion and updating a shared data store.

With continuing reference to FIG. 4 and with further reference to FIG. 14, having received the non-binding suggestion 411 and communicated non-binding suggestion 411 data to the completion monitor 420, at 1402, the interface controller 430 determines whether or when to process the non-binding suggestion 411. This may be based on a configuration file 433. When a non-binding suggestion 411 is selected for execution, at 1404, the interface controller 430 generates or selects first interview screen 432 including content based on a non-binding suggestion 411/ selected candidate question 462 and presents a first interview screen 432 to the user through display of the user's computing apparatus. At 1406, the user provides input or a response to the question presented via a keyboard, mouse or other input device, and the interface controller 430 receives this additional tax return data (or other data by importation, for example) and at 1408, writes the additional tax return data to the shared data store 430 to update the runtime or instance data 442. At 1410, the calculation engine 480 performs processing of FIG. 11 as necessary on updated runtime/instance data 442 to generate and write additional updates in the form of calculation results to the shared data store 440.

Figure 15:
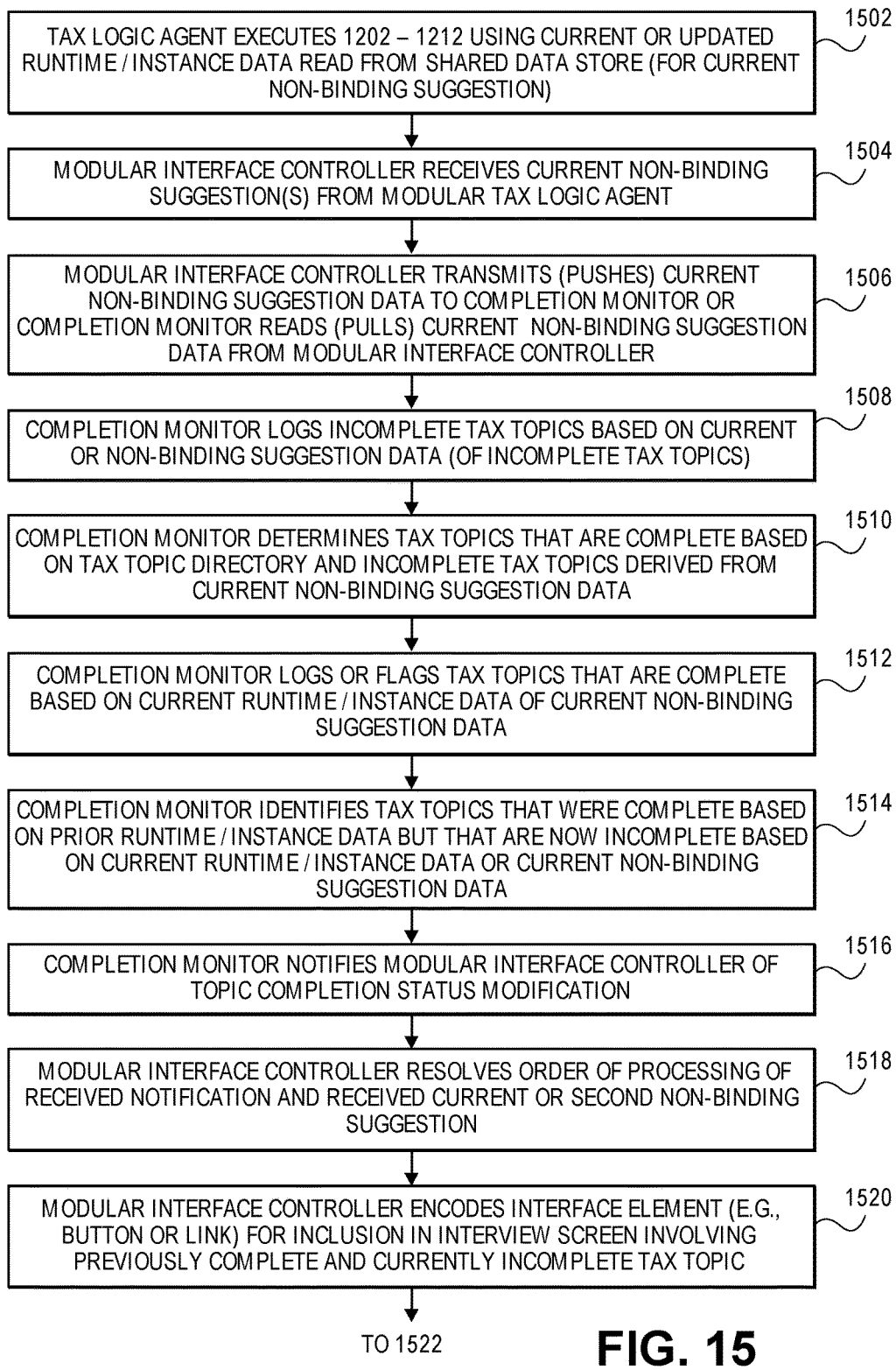
FIG. 15 is a flow diagram illustrating a computer-implemented algorithm involving an interface controller communicating with a completion monitor and a completion monitor identifying tax topics that were previously complete but currently incomplete based on the current runtime data.
Figure 15:
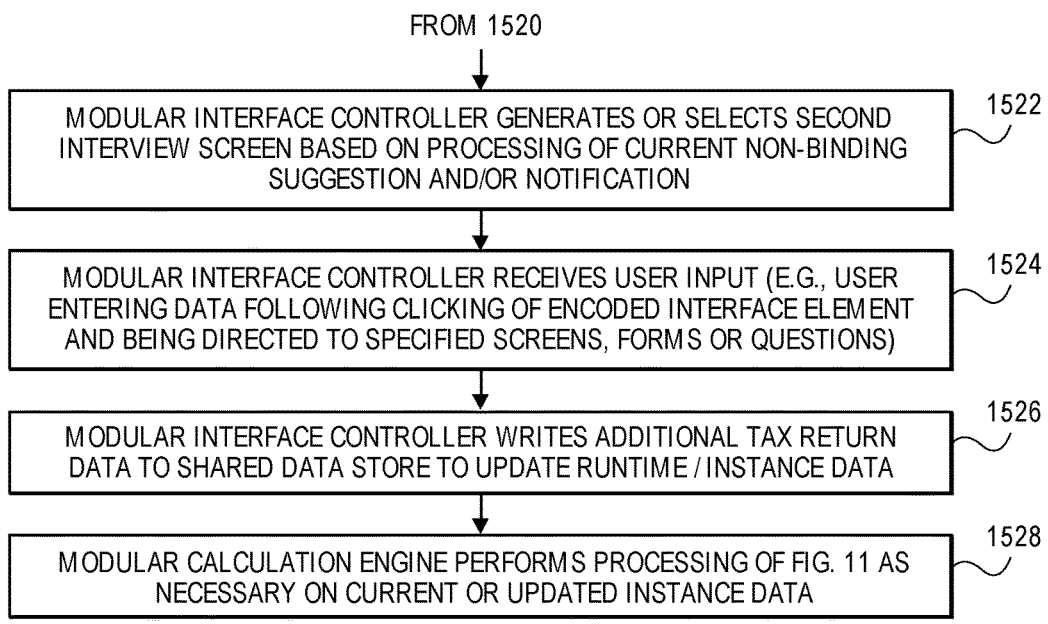

With continuing reference to FIG. 4, and with further reference to FIG. 15, at 1502, the tax logic agent 410 executes 1202-1212 of FIG. 12 using the current or updated runtime or instance data 442 read from the shared data store 440 (for generation of current non-binding suggestions 411), and at 1504, the interface controller 430 receives current non-binding suggestion(s) 411 from the tax logic agent 410. At 1506, the interface controller 430 transmits or pushes the current non-binding suggestion 411 data to the completion monitor 420, or the completion monitor 420 reads or pulls the current non-binding suggestion 411 data from interface controller 430.

With continuing reference to FIG. 15, at 1508, the completion monitor 420 logs the incomplete 224 tax topics based on current or non-binding suggestion data (of incomplete tax topics), and at 1510, determines the other tax topics that are complete 223, and logs this incomplete and complete tax topic data at 1512. At 1514, the completion monitor 420 checks the log 422 to identify tax topics that were previously complete 423 based on prior runtime/instance data 442 (e.g., the set of runtime/instance data 442 immediately preceding the current or updated runtime/instance data 442) but that are now incomplete 424 based on the current runtime/instance data 442, and for these identified tax topics that were modified from complete 423 to incomplete 424, at 1516, the completion monitor 420 transmits a notification 421 regarding the completion status modification to the interface controller 430.

Tax topic completion status monitoring, identification of tax topics and transmission of notifications 421 from the completion monitor 420 to the interface controller 430 may be activated or enabled from the beginning of preparation of the electronic tax return, or in other embodiments, at least notification 421 transmission can be activated or enabled in response to certain actions or pre-determined criteria.

For example, in one embodiment, completion status monitoring and modifications are determined, but notifications 421 to the interface controller 430 are enabled in response to a user request, or enabled automatically and selectively depending on the status of completion or whether certain types of data have been entered or certain types, or numbers or combinations of tax topics have been completed, and this may occur before final error check is performed. In one embodiment, completion status monitoring and modification or transformation of the interview screens 432 are performed after a pre-determined or minimum amount of data, or after certain types of data, have been entered into the electronic tax return. Thus, rather than having the completion monitor 420 generate and transmit notifications 421 to the user during the early stages of electronic tax return preparation (during which greater numbers, possibly all, tax topics are incomplete), embodiments may be triggered to be activated after certain data has been entered so that the interface controller 430 is not processing completion status notifications 421 when a user has recently begun preparing the electronic tax return and there is a large number of incomplete tax topics to address.

For example, embodiments may be configured such that notifications 421 are enabled to be generated and provided to the interface controller 430 upon completion of a broader general category of tax topics such as "Income" or "Deductions" or "Personal Information," or triggered to generated and provided to the interface controller 430 based on data of more specific tax topics such as more specific income topics such as dependents, "W2" or "K1," interest income, dividend income, health insurance, housing deductions, child care deductions and charity deductions. Embodiments may also be configured such that notifications 421 can be generated and provided to the interface controller 430 upon completion of a certain pre-determined combination or number of tax topics, e.g., executed in response to completion of "personal information" and "income" for at least one taxpayer (e.g., if married filing jointly), or in response to completion of at least two tax topics (e.g., personal information and W2 and housing deductions). Accordingly, it will be understood that embodiments may be configured in different ways so that the completion monitor 420 or certain functions thereof are enabled or activated based on certain criteria or combinations thereof, which may involve one or more topics and/or one or more sub-topics.

Continuing with FIG. 15, with the completion monitor 420 and notification 421 enabled, at 1518, the interface controller 430 resolves how to process the notification 421 received from the completion monitor 420 and the non-binding suggestion 411 received from the tax logic agent 410, e.g., as specified by a configuration file 433 and prioritization specifications. The notification 421 and the non-binding suggestion 411 may involve the same subject matter, i.e., the non-binding suggestion 411 may involve various incomplete topics 424 identified by the tax logic agent 410, and a tax topic that was previously complete 423 but is currently incomplete 424 as identified by the completion monitor 420. Resolution may involve the interface controller 430 analyzing the notification 421 and the non-binding suggestion 411 to prioritize processing of a first non-binding suggestion 411 that involves a tax topic that was previously complete 423 but is currently incomplete 424 (as indicated by the notification 411 received from the completion monitor 420) over a second non-binding suggestion 411 that also involves an incomplete tax topic but was not identified in the notification 421 as being previously complete.

In another embodiment, if the notification 421 concerns a tax topic that was previously complete 423 but currently incomplete 424, but no non-binding suggestion 411 involves that currently incomplete 424 tax topic, a configuration file 433 may specify that the interface controller 430 processes the subject matter of the notification 421 first and generates an interview screen 432 involving that previously complete 423 and currently incomplete 424 tax topic before other incomplete topics of non-binding suggestions 411.

With continuing reference to FIG. 15, at 1520, the interface controller 430, following processing of notification 421, encodes one or more UI elements 433 (e.g., button or link) for inclusion in a second interview screen 432b ("b" generally referring to a second interview screen) involving previously complete 432 and currently incomplete 424 tax topic, and at 1522, generates or selects the second interview screen 432b incorporating the UI element 433 (for when notification 421 is processed) or including content based on processing of a non-binding suggestion 411. At 1524, the interface controller 430 receives a response or input through the second interview screen 432b, which may involve the user clicking the UI element 433 and being directed to interview screens or forms or a sequence thereof specified in the encoded UI element 433 based on the notification 421. At 1526, the interface controller 430 writes additional tax return data (e.g., user input provided in response to an interview screen sequence presented following user selection of the encoded UI element 433) to the shared data store 440 to update runtime/instance data 442, and at 1528, the iterative processing continues with FIG. 11, and the calculation engine 480 performing processing of FIG. 11 as necessary on current or updated instance data 442.

Figure 16A:
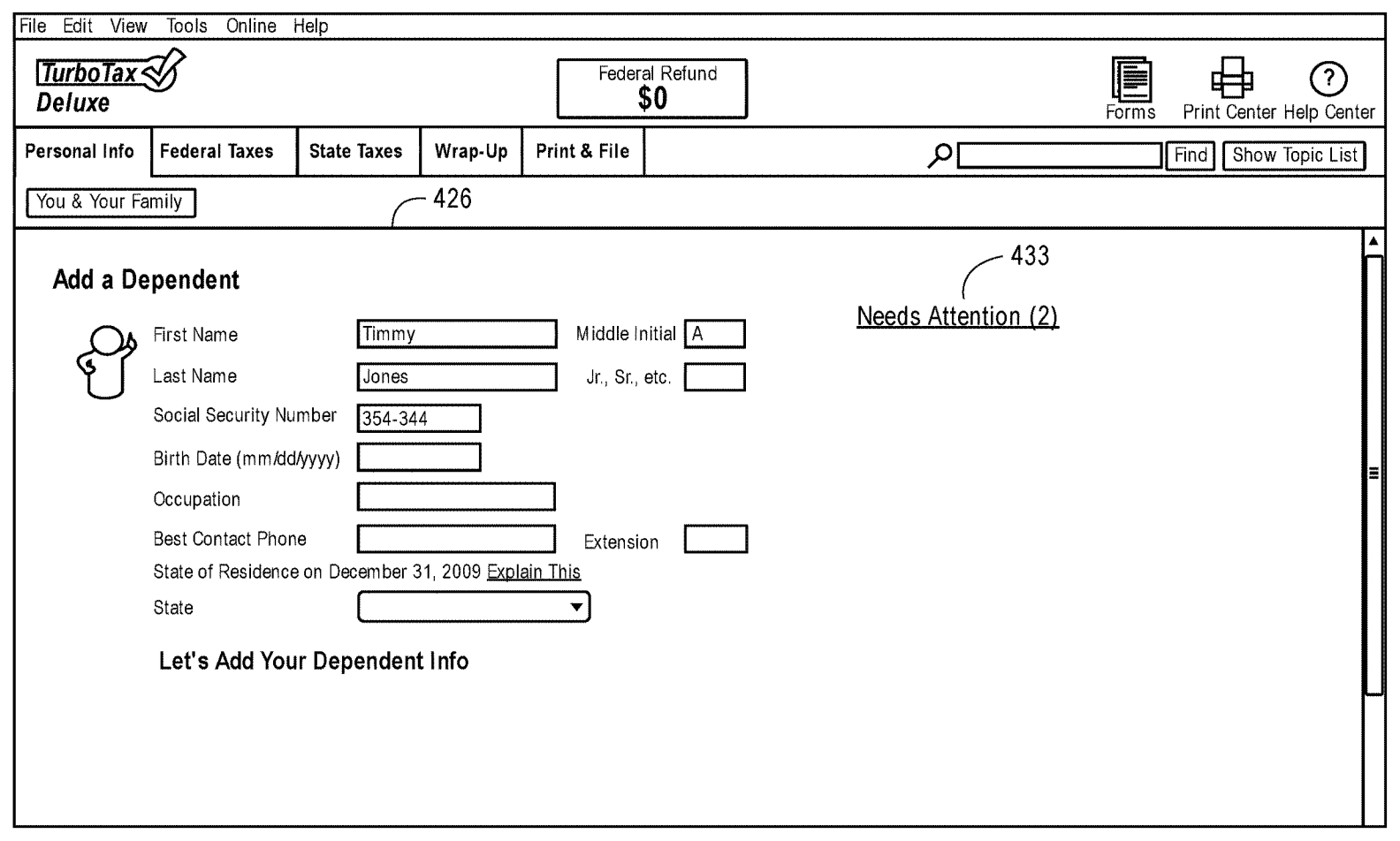
Figure 16B:
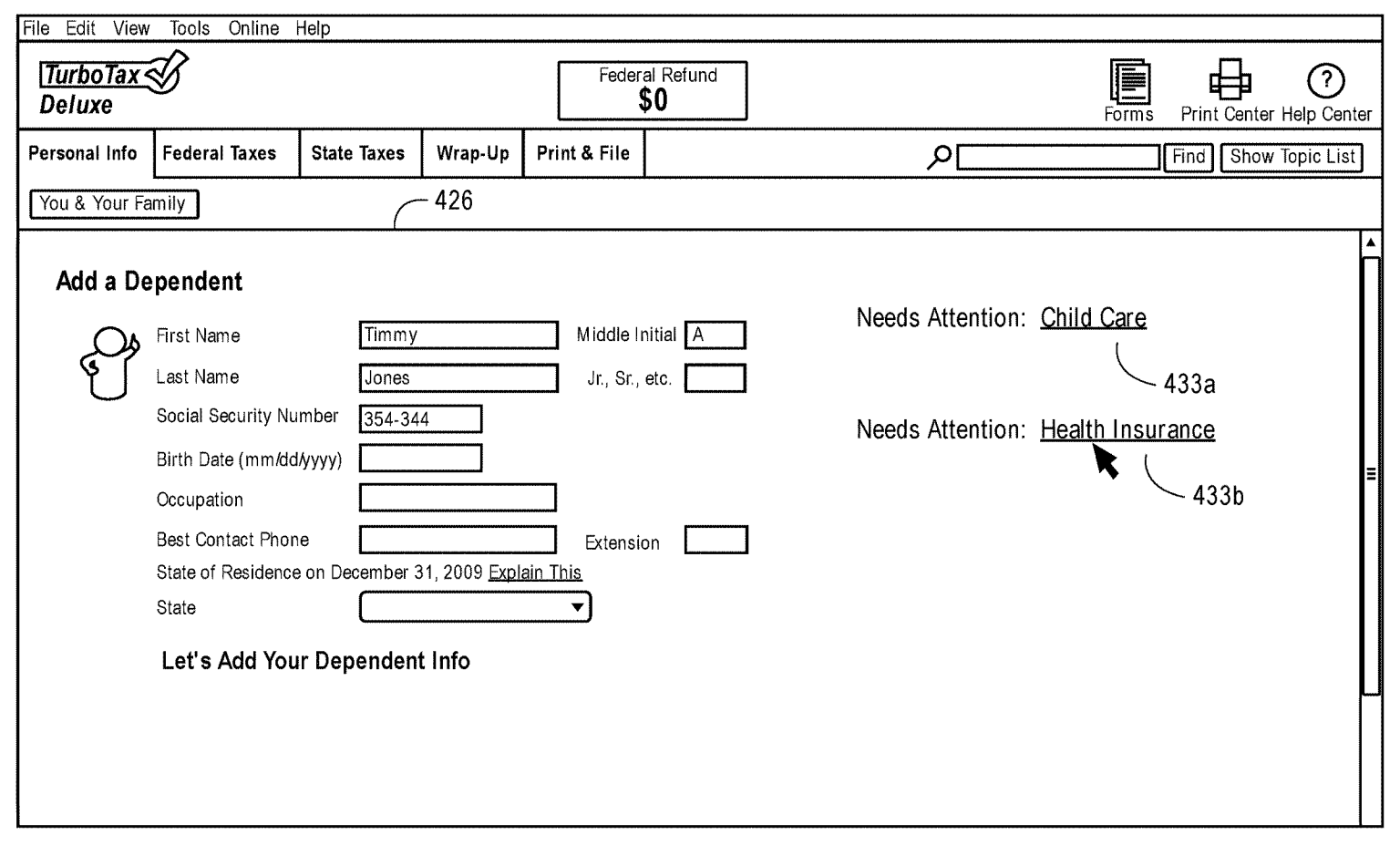

Referring to FIGS. 16A-B, an interview screen 432 generated by processing a notification 421 involving a tax topic that was previously complete 423 but is now incomplete 424 may include one or multiple encoded UI elements 433 such as a button or link that is displayed to the user and can be selected via a keyboard, mouse or other input device of the user's computing apparatus. The UI element 433 can be presented to the user in different ways and convey different information about the incomplete 424 topics requiring attention.

According to one embodiment, as shown in FIG. 16A, the interview screen 432 including the encoded UI element 433 is the "first" or "prior" interview screen that was displayed to the user, with the added encoded UI element 433 incorporated therein. Thus, the encoded UI element 433 can be added to or incorporated into a currently displayed interview screen 432 such that the user is presented with a second interview screen 432b that is the first interview screen 432a modified to include the UI element 433. The UI element 433 may, for example, may be positioned to be proximate to the topics, questions or fields that are incomplete 424.

According to another embodiment, the interface controller 430 is configured to generate a separate interview screen 432 such that the user is presented with a simultaneous view of the first or currently displayed interview screen 432a and a separate second interview screen 432b that includes the encoded UI element 433. This display arrangement allows the user to keep their place or view where they were before being informed about the previously complete and currently incomplete tax return topic while being able to separately address previously complete and currently incomplete tax topics in an independent interview screen 432b or window with the encoded UI element 433. These embodiments may involve a cascaded window or tile arrangement. The interface controller 430 may structure the interview screens 432 such that the second interview screen 432b or window that includes the encoded UI element 433 at least partially overlays the first or prior interview screen 432a, or the second interview screen 423b can be emphasized (e.g., more prominent size, shape and/or color) so that the user is encouraged to address the incomplete tax topics 224 that were the subject of the notification 421, while also being able to view or switch between the first interview screen 432a and the second interview screen 432b. According to another embodiment, the interface controller 430 may lock the first interview screen 432a until the user addresses the previously complete 423 but currently incomplete 424 tax topics that were the subject of the notification 421, or at least select the UI element 433 to be informed about the previously complete 423 but currently incomplete 424 tax topics, after which the first interview screen 432a can be unlocked and the user can decide whether to proceed with the first interview screen 432a or the second interview screen 432b including the UI element 432.

A second interview screen 432b including an encoded UI element 433 according to embodiments may encoded such that the UI element or link 433 can be selected by the user to then display an expanded list of UI elements or links 433 of more specific tax topics, sub-topics or questions. Selection if the UI element 433 can be encoded to direct the user to a single form or interview screen that is the subject of the notification 432 or present a series of interview screens or forms. Thus, the user is directed to the particular interview screens 432 that require attention without having to navigate through various menu items, screens or forms and without having to perform searches related to the areas that require attention.

According to one embodiment, the UI element 433 may indicate a number of previously complete and currently incomplete topics identified in the notification 421 that require attention by the user and/or a number of questions of each of the previously complete 223 and currently incomplete 224 topics that require user attention. The UI element 433 in the form of a button or link may include a message or indicator regarding a description of the topic, a number of previously complete 223 and currently incomplete 224 topics and/or questions thereof that require attention.

Figure 16C:
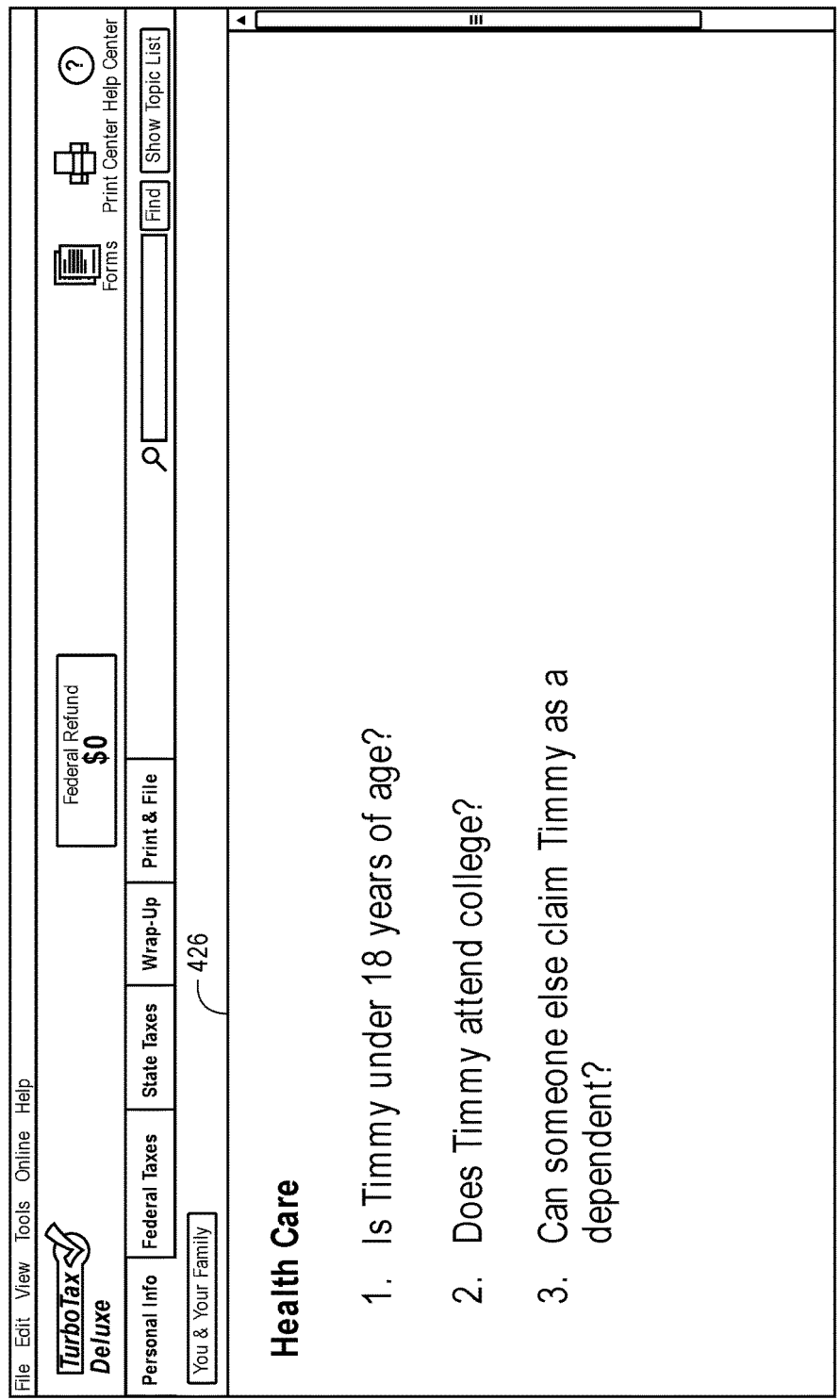

For example, as generally illustrated in FIGS. 16B-C, an interview screen 432 including the UI element 433 may include a message or other indicator of "Needs Attention (X)." or "Topics Require Attention (X)" wherein "X"=a number of previously complete 223 and currently incomplete 224 tax topics that are required to be addressed by the user. As the user addresses a topic, the count "X" can be decremented, and if the user's response results in other areas that require attention, the count may be incremented. As another example, an interview screen including the UI element 433 may include a message or indicator of "Questions Need Attention (Y)" or "Questions (Y) for Topic Need Attention" wherein "Y"=a number of questions of a previously complete 223 and currently incomplete 224 tax topic. As the user addresses questions of a previously complete 223 but currently incomplete 224 topic, the count "Y" can be decremented, and if the user's response results in other areas that require attention, the count may be incremented.

Embodiments may also involve UI elements 433 for a combination of topics and questions. For example, an interview screen 432 including multiple UI elements 433 for respective topics and include a message or other indicator of "Topics Require Attention (X)" wherein "X"=a number of previously complete 423 and currently incomplete 424 tax topics that are required to be addressed by the user (and the number of UI elements 433 displayed when one UI element 433 is encoded for each topics), and proximate to each topic UI element 433, "Questions (Y) for [Topic] Need Attention" wherein "Y"=a number of questions of a previously complete 423 and currently incomplete 424 tax topic. As the user addresses questions of a previously complete 423 but currently incomplete 424 topic, the counts "X" and "Y" can be decremented, and if the user's response results in other areas that require attention, the count may be incremented.

Referring again to FIG. 4, in another system configuration, the completion monitor 420 is positioned between the tax logic agent 410 and the interface controller 430 to "intercept" the non-binding suggestion 411 from the tax logic agent 410 (as shown by dashed line 428 in FIG. 4). Thus, rather than receive non-binding suggestion 411 data from the interface controller 430, or pull non-binding suggestion 411 data from the interface controller 430, the completion monitor 420 receives or intercepts the non-binding suggestion 411, identifies incomplete topics that are the subject of the non-binding suggestion 411, derives the complete topics via the topic directory 426 and log 422, and then communicates with the interface controller 430.

According to one embodiment, when a tax topic that was previously complete 423 but is currently incomplete 242 is identified, the completion monitor 420 modifies the non-binding suggestion 411 by incorporating or appending a notification 421 concerning the previously complete 423 and currently incomplete 424 tax topic to the non-binding suggestion 411, and then transmits the modified non-binding suggestion 411 to the interface controller 430 for processing.

According to another embodiment, when a tax topic that was previously complete 423 but is currently incomplete 424 is identified, the completion monitor 420 first transmits a notification 421 concerning the previously complete 423 and currently incomplete 424 tax topic to the non-binding suggestion 411 so that the tax topics identified by the completion monitor 420 can be processed first or are considered first by the interface controller 430, and then subsequently transmits the non-binding suggestion 411 to the interface controller 430 for processing.

When all of the data has been received for the required calculations to complete the tax return, the tax return is ready to be filed. For example, as noted above, the tax logic agent 410 may determine that all of the conditions of the completeness graph 465 have been satisfied such that a "fileable" tax return can be prepared with the existing runtime data 442. When the electronic tax return is populated and completed by the tax logic agent 410 or by the direction of the tax logic agent 410 or using one or more components or services 470 as applicable, the electronic tax return can be printed and/or filed with a tax authority such federal state or local tax authority or other tax collecting entity such as Internal Revenue Service and Franchise Tax Board of the State of California.

Figure 17:
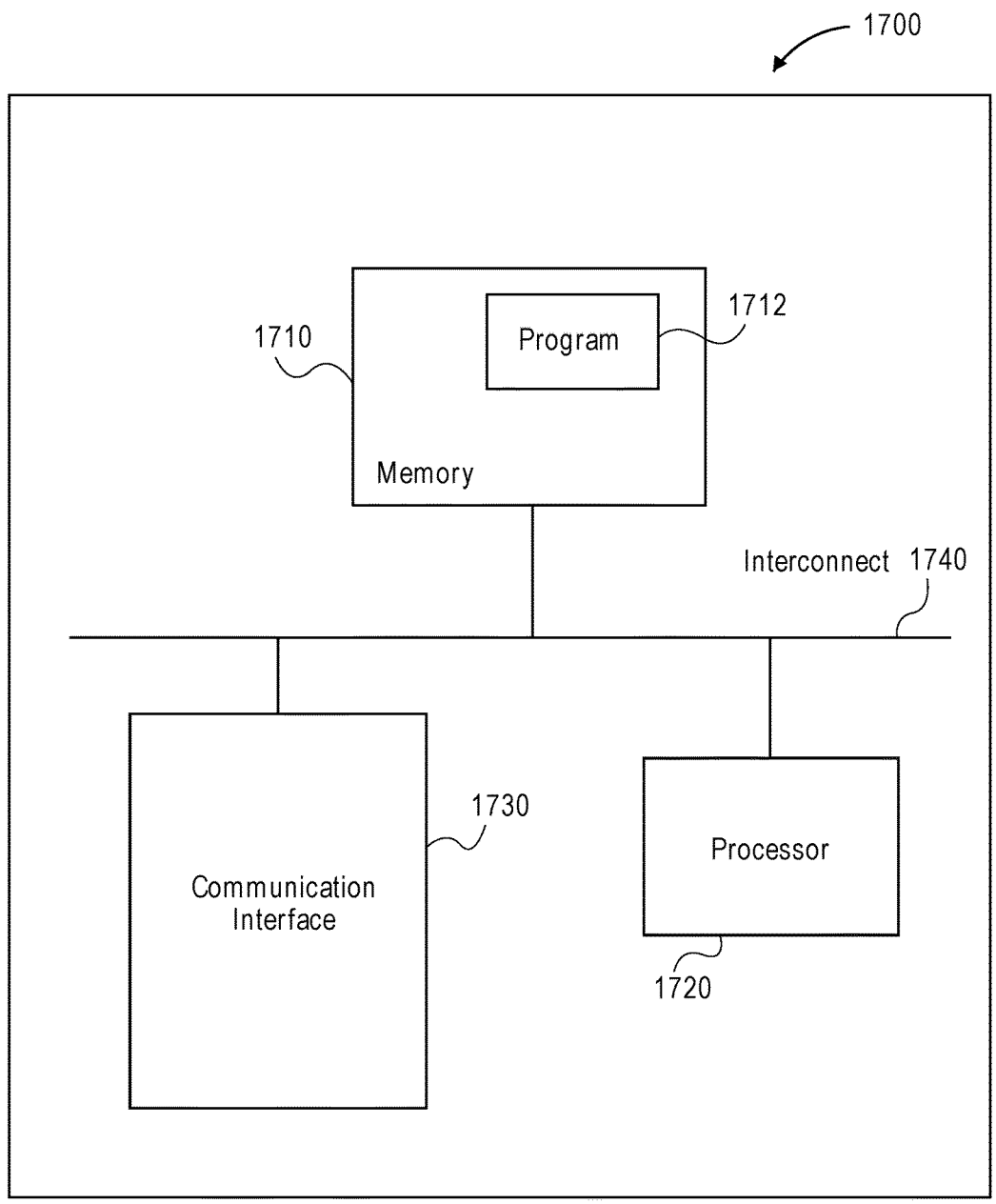
FIG. 17 is a block diagram of components of a system constructed to illustrate how described embodiments may be configured and implemented.

FIG. 17 generally illustrates certain components of a computing device 1700 that may be utilized to execute or that may embody components of embodiments. For example, the computing device may include a memory 1710, program instructions 1712, a processor or controller 1720 to execute instructions 1712, a network or communications interface 1730, e.g., for communications with a network or interconnect 1740 between such components. The memory 1710 may be or include one or more of cache, RAM, ROM, SRAM, DRAM, RDRAM, EEPROM and other types of volatile or non-volatile memory capable of storing data. The processor unit 1720 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 1740 may include a system bus, LDT, PCI, ISA, or other types of buses, and the communications or network interface may, for example, be an Ethernet interface, a Frame Relay interface, or other interface. The network interface 1730 may be configured to enable a system component to communicate with other system components across a network which may be a wireless or various other networks. It should be noted that one or more components of computing device 1700 may be located remotely and accessed via a network. Accordingly, the system configuration provided in FIG. 17 is provided to generally illustrate how embodiments may be configured and implemented.

Method embodiments or certain steps thereof, some of which may be loaded on certain system components, computers or servers, and others of which may be loaded and executed on other system components, computers or servers, may also be embodied in, or readable from, a non-transitory, tangible medium or computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 2020 performs steps or executes program instructions 2012 within memory 2010 and/or embodied on the carrier to implement method embodiments.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

For example, while certain embodiments have been described with reference to a tax return preparation application and detecting and processing tax topic completion status modifications, embodiments may executed in other domains.

Accordingly, embodiments are intended to exemplify alternatives, modifications, and equivalents that may fall within the scope of the claims.

What is claimed is:

1. A computing system, the computing system comprising a computer processor and a non-volatile memory, the memory storing computer-executable instructions of a computerized tax return preparation application and the computer processor executing the computer-executable instructions to cause the computing system to:
by executing a modular logic engine of the tax return preparation application,
receive first runtime data of the electronic tax return from a shared data store,
identify a first incomplete tax topic based at least in part upon the first runtime data and at least one decision table based on a directed graph, and
generate a first non-binding suggestion involving the first incomplete tax topic;
by executing a modular interface controller of the tax return preparation application,
receive the first non-binding suggestion and present a first interview screen to a user of the tax return preparation application through a display of a user computer, the first interview screen comprising first content based at least in part upon the first non-binding suggestion involving the first incomplete tax topic;
by executing the modular logic engine,
identify a second tax topic that is previously complete based on the first runtime data but currently incomplete based on second runtime data read from the shared data store, the second runtime data comprising a change relative to the first runtime data;
by executing a completion monitor of the tax return preparation application in communication with the modular interface controller, determine when a completion status of the second tax topic is modified from a complete status to an incomplete status based at least in part upon the decision table and the second runtime data, and
notify the modular interface controller of the modified completion status of the second tax topic; and
by executing the modular interface controller, encode a user interface element for the second tax topic identified in the notification such that the user interface element at least partially overlays the second interview screen, and
present a second interview screen including the encoded user interface element to the user through the display of the user computer.

2. The computing system of claim 1, wherein the modular rule engine comprises a rule engine that is executed by the computer processor on a declarative knowledge base.

3. The computing system of claim 1, wherein the at least one decision table is generated by transforming a first data structure into a second data structure comprising the directed graph, and transforming the second data structure into a third data structure comprising the decision table, the decision table comprising a plurality of rows and a plurality of columns, each row defining a rule and each column defining a question.

4. The computing system of claim 3, wherein the first data structure is a pre-determined question-and-answer flow for a tax topic.

5. The computing system of claim 1, wherein the completion monitor, is configured or executed to cause the computing system to determine when a completion status of a third tax topic is modified from a complete status to an incomplete status based at least in part upon the at least one decision table and the second runtime data, and notify the modular interface controller of the modified completion status of the third tax topic.

6. The computing system of claim 1, wherein the notification is generated and transmitted independently of the non-binding suggestion, and the modular logic engine is configured or executed to cause the computing system to generate and transmit the non-binding suggestion to the modular interface controller independently of the completion monitor transmitting the notification to the modular interface controller.

7. The computing system of claim 1, wherein the notification and the non-binding suggestion involve the modified completion status of the second tax topic.

8. The computing system of claim 7, wherein the modular interface controller is configured and executed to cause the computing system to prioritize processing of a first non-binding suggestion involving the first tax topic over a second non-binding suggestion that does not involve the first tax topic.

9. The computing system of claim 8, wherein the modular interface controller is configured to prioritize processing of a first non-binding suggestion involving the second tax topic over a second non-binding suggestion involving an incomplete tax topic having a status that was not previously modified from complete to incomplete.

10. The computing system of claim 1, wherein the completion monitor is in communication with the modular logic engine and the modular interface controller and configured or executed to cause the computing system to receive from the modular logic engine tax topics identified by the modular logic engine as being complete based on the first runtime data, tax topics identified by the modular logic engine as being incomplete based on the first runtime data, tax topics identified by the modular logic engine as being complete based on the second runtime data, and tax topics identified by the modular logic engine as being incomplete based on the second runtime data, log tax topic completeness and incompleteness for the first runtime data and the second runtime data, and determine a change of completion status based at least in part upon the log.

11. The computing system of claim 1, wherein the completion monitor is in communication with the modular logic engine and the modular interface controller and configured or executed to cause the computing system to receive from the modular logic engine tax topics identified by the modular logic engine as being incomplete based on the first runtime data, determine tax topics that are complete based on the second runtime data, receive from the modular logic engine tax topics identified by the modular logic engine as being incomplete based on the second runtime data, determine tax topics that are complete based on the second runtime data, log tax topic completeness and incompleteness for the first runtime data and the second runtime data, and determine a change of completion status based at least in part upon the tax topic completeness history and current runtime data.

12. The computing system of claim 1, wherein the second runtime data comprises at least one change relative to the first runtime data due to at least one of adding, deleting, modifying, retracting or importing data to the data store, or as a result of an executed tax calculation.

13. The computing system of claim 1, wherein the completion monitor is in communication with the modular logic engine and the modular interface controller and configured or executed to cause the computing system to intercept the non-binding suggestion generated by the modular logic engine; identify tax topics including the second tax topic that are identified by the modular logic agent as being incomplete based at least in part upon the intercepted non-binding suggestions; determine tax topics that are complete based at least in part upon the incomplete tax topics of the intercepted non-binding suggestions; transmit the intercepted non-binding suggestion to the modular interface controller; and transmit the notification involving the second tax topic to the modular interface controller.

14. The computing system of claim 1, wherein the completion monitor is further configured and executed to cause the computing system to modify a completion log based least in part upon the second runtime data, the completion log indicating a current completion status for each tax topic.

15. The computing system of claim 1, wherein the previously complete but currently incomplete tax topic identified in the notification is processed by the modular interface controller before other incomplete tax topics identified in one or more non-binding suggestions that were not previously complete.

16. The computing system of claim 15, wherein the previously complete but currently incomplete tax topic identified in the notification is processed immediately by the modular interface controller.

17. The computing system of 1, wherein the previously complete but currently incomplete tax topic identified in the notification is processed without reference to a pre-determined sequence of tax topics.

18. The computing system of claim 1, wherein the completion monitor is configured or programmed to notify the modular interface controller concerning multiple tax topics that were previously complete but currently incomplete based at least in part upon the second runtime data, the modular interface controller being further configured to determine a sequence of processing currently incomplete tax topics identified within a notification received from the completion monitor.

19. The computing system of claim 18, wherein the sequence of processing the previously complete but currently incomplete tax topics identified in one or more notifications is based at least in part upon which tax topic was visited by the user most recently.

20. The computing system of claim 18, wherein the sequence of processing the previously complete but currently incomplete tax topics identified in one or more notifications is based at least in part upon how many questions are required to be answered in order to complete previously complete but currently incomplete tax topic, and wherein previously complete but currently incomplete tax topics with fewer questions to be answered are prioritized over other previously complete but currently incomplete tax topics.

21. The computing system of claim 18, wherein all non-binding suggestions involving previously complete and currently incomplete tax topics are prioritized over all other non-binding suggestions involving incomplete tax topics that were not previously complete.

22. The computing system of claim 1, further comprising a configuration file, wherein the modular interface controller is configured to execute the configuration file to determine when to generate the second interface comprising the second interview screen involving the second tax topic identified in the notification relative to execution of other non-binding suggestions generated by the modular logic engine.

23. The computing system of claim 22, wherein the configuration file is modified, deleted, replaced and executed independently of the modular logic engine and the modular interface controller.

24. The computing system of claim 1, wherein the second interview screen involving the second tax topic identified in the notification comprises a user interface element relating to the previously completed and currently incomplete tax topic and displayable on the computer screen such that the user interface element can be selected by the user manipulating an input element of the computer.

25. The computing system of claim 24, wherein the second interview screen comprises the first interview screen and the user interface element located adjacent to the second runtime data resulting in the previously completed second tax return topic being incomplete.

26. The computing system of claim 24, wherein the modular interface controller is configured and executed to cause the computing system to simultaneously display the first interview screen and the second interview screen in a cascaded screen display, and wherein the first interview screen is at least partially overlaid with the second interview screen.

27. The computing system of claim 24, wherein the modular interface controller is configured and executed to cause the computing system to simultaneously display the first interview screen and the second interview screen in a tiled interview screen arrangement.

28. The computing system of claim 27, wherein the content of the first interview screen is not accessible during a display of the user interface element or a display of the second interview screen until the user interacts with the generated user interface element.

29. The computing system of claim 24, wherein the user interface element comprises a button or link to an interview screen of the previously complete but currently incomplete tax topic.

30. The computing system of claim 29, wherein the user interface element further comprises or is associated with a message describing the previously complete but currently incomplete tax topic and indicating a number of previously complete but currently incomplete topics that require attention by the user.

31. The computing system of claim 29, wherein the user interface element further comprises a message indicating a number of previously complete but currently incomplete topics that require attention by the user, and a number of questions of each of the previously complete but currently incomplete topics that require attention by the user.

32. The computing system of claim 29, wherein the user interface element comprises a button or link including or associated with a message indicating a number of questions of a previously complete but currently incomplete topic that require attention by the user.

33. The computing system of claim 25, wherein the second interview screen comprises
   a plurality of user interface elements including or associated with respective messages indicating
   respective topics that require attention by the user, and
   respective numbers of questions for each topic that requires attention by the user.

34. The computing system of claim 24, wherein the user interface element comprises a button or link and a message indicating "Needs Attention (X)," wherein "X"=a number of previously complete but currently incomplete tax topics that are required to be addressed by the user.

35. The computing system of claim 24, wherein the user interface element comprises a button or link and a message indicating "Topics Need Attention (X)," wherein "X"=a number of previously complete but currently incomplete tax topics that are required to be addressed by the user and "Questions Need Attention (Y)," wherein "Y"=a sum of respective numbers of questions of each previously complete but currently incomplete tax topic.

36. The computing system of claim 1, wherein the shared data store is shared by the modular logic engine and the modular interface controller, wherein the modular interface controller writes updated runtime data to the shared data store, and the modular logic engine reads the updated runtime data from the shared data store, and wherein the computing system is further caused to:

by executing the modular logic engine receive first runtime data of the electronic tax return from the data store, execute a decision table based on a directed graph against the first runtime data, identify the second tax topic that is incomplete based at least in part upon at least one decision table and the first runtime data, and generate a first non-binding suggestion involving the first tax topic;

by executing the modular interface controller, receive the first non-binding suggestion transmitted by the modular rule engine, generate a first interface comprising a first interview screen presented to a user of the tax return preparation application through a display of the user computer, the first interview screen comprising first content based at least in part upon the first non-binding suggestion, and generate a second interface comprising a second interview screen involving the second tax topic identified in the notification and presented to the user through the display of the user computer.

37. The system of claim 1, wherein the modular rule engine and the modular interface controller are configured to be loosely coupled to each other such that the first non-binding suggestion does not control the modular interface controller determining the first content of the first interview screen.

* * * * *